United States Patent
Yamamoto

(10) Patent No.: US 9,671,667 B2
(45) Date of Patent: Jun. 6, 2017

(54) ELECTROPHORETIC PARTICLE, ELECTROPHORETIC PARTICLE DISPERSION LIQUID, DISPLAY MEDIUM, AND DISPLAY DEVICE

(71) Applicant: FUJI XEROX CO., LTD., Tokyo (JP)

(72) Inventor: Yasuo Yamamoto, Kanagawa (JP)

(73) Assignee: E Ink Corporation, Billerica, MA (US)

( * ) Notice: Subject to any disclaimer, the term of this patent is extended or adjusted under 35 U.S.C. 154(b) by 693 days.

(21) Appl. No.: 13/973,611

(22) Filed: Aug. 22, 2013

(65) Prior Publication Data
US 2014/0240814 A1    Aug. 28, 2014

(30) Foreign Application Priority Data

Feb. 28, 2013  (JP) .................................. 2013-039683

(51) Int. Cl.
| | | |
|---|---|---|
| C09D 5/24 | (2006.01) | |
| H01B 1/02 | (2006.01) | |
| G02F 1/167 | (2006.01) | |
| C08L 33/06 | (2006.01) | |

(52) U.S. Cl.
CPC .............. *G02F 1/167* (2013.01); *C08L 33/06* (2013.01); *G02F 2001/1678* (2013.01)

(58) Field of Classification Search
CPC ... G02F 1/167; G02F 2001/1678; C08L 33/06
USPC ........................................................ 252/500
See application file for complete search history.

(56) References Cited

U.S. PATENT DOCUMENTS

| | | | |
|---|---|---|---|
| 2006/0187188 A1 | 8/2006 | Kanbe | |
| 2009/0086308 A1 | 4/2009 | Okuyama et al. | |
| 2009/0201569 A1 | 8/2009 | Akashi et al. | |
| 2010/0073281 A1* | 3/2010 | Moriyama | G02F 1/167 345/107 |
| 2010/0208331 A1 | 8/2010 | Kanbe | |
| 2011/0306742 A1* | 12/2011 | Farrand | C08F 220/14 526/219.1 |

FOREIGN PATENT DOCUMENTS

| | | |
|---|---|---|
| JP | A-3-249736 | 11/1991 |
| JP | A-2003-131420 | 5/2003 |
| JP | A-2006-235225 | 9/2006 |

(Continued)

*Primary Examiner* — Harold Pyon
*Assistant Examiner* — Danny N Kang
(74) *Attorney, Agent, or Firm* — Brian D. Bean

(57) ABSTRACT

An electrophoretic particle includes a polymer having at least a reactive compound represented by the following Formula (I) as a polymerizable component, at least on a surface:

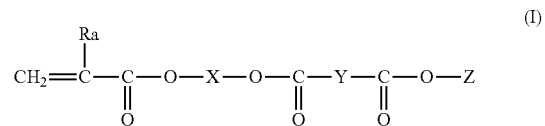

wherein in Formula (I), Ra represents a hydrogen atom or a methyl group, X represents a substituted or unsubstituted divalent hydrocarbon group, Y represents a substituted or unsubstituted divalent hydrocarbon group, and Z represents a hydrogen atom, or a substituted or unsubstituted monovalent hydrocarbon group.

16 Claims, 3 Drawing Sheets

(56) References Cited

FOREIGN PATENT DOCUMENTS

| JP | A-2009-86135 | 4/2009 |
|----|----|----|
| JP | A-2009-186808 | 8/2009 |
| JP | A-2010-244069 | 10/2010 |
| JP | A-2011-27781 | 2/2011 |
| JP | A-2011-153215 | 8/2011 |
| JP | A-2011-170044 | 9/2011 |
| JP | A-2012-173539 | 9/2012 |

* cited by examiner

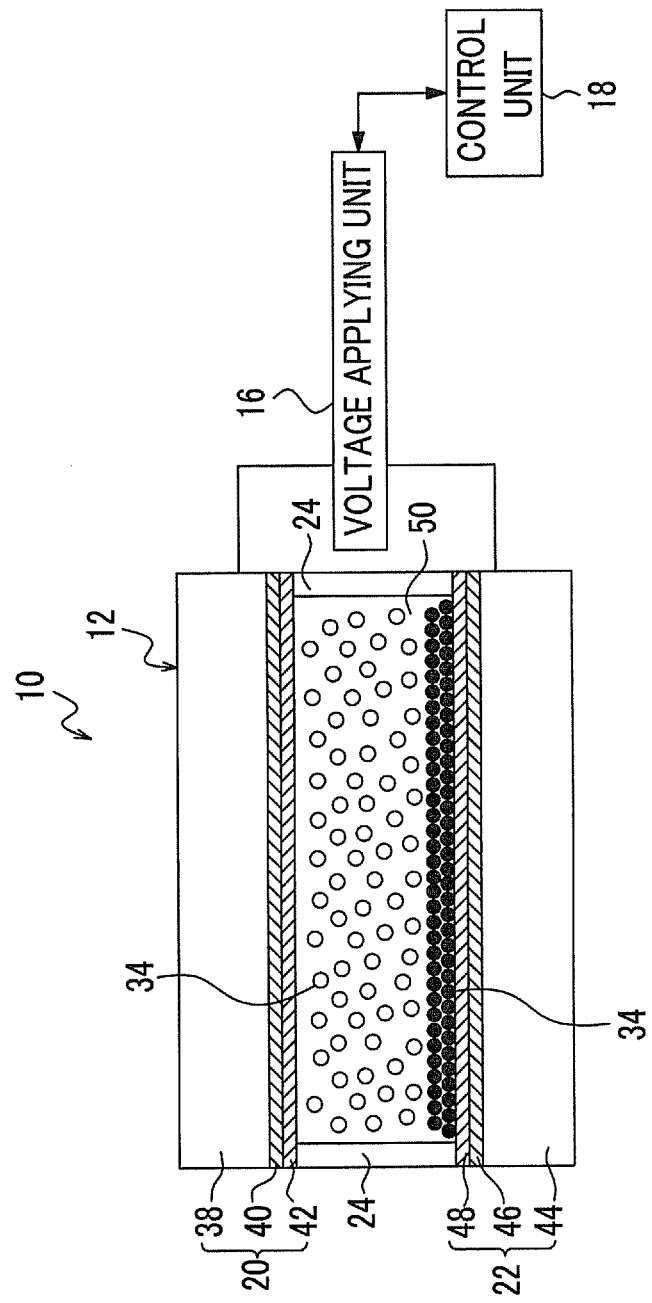

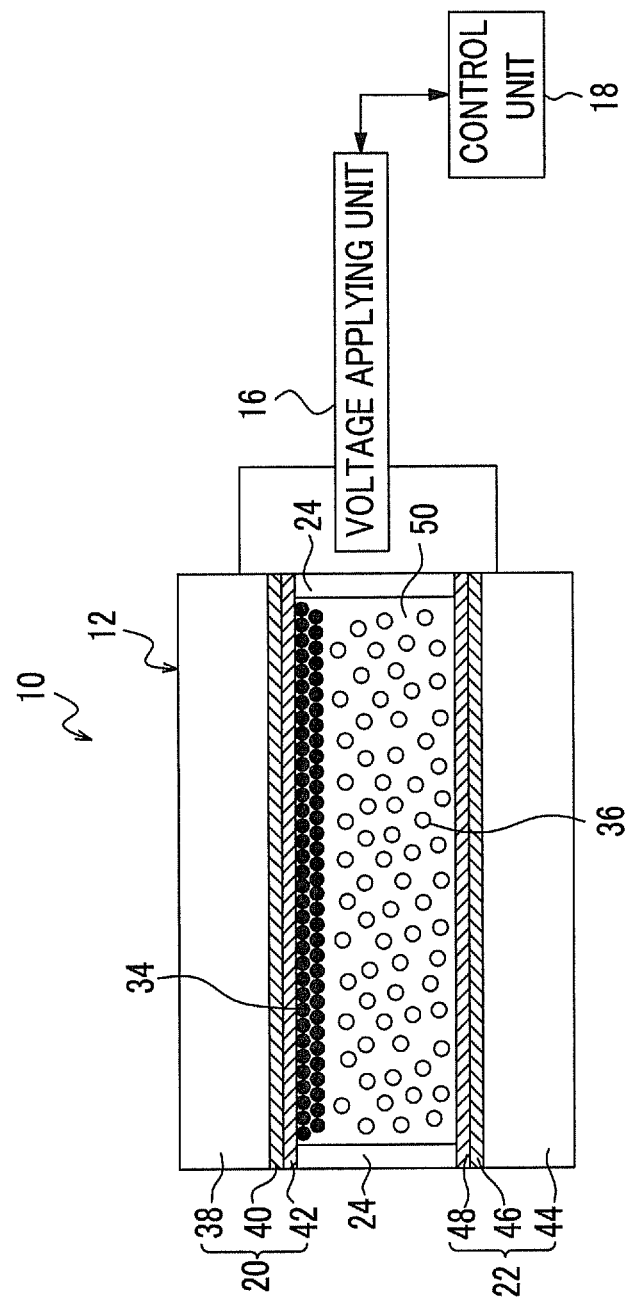

ELECTROPHORETIC PARTICLE, ELECTROPHORETIC PARTICLE DISPERSION LIQUID, DISPLAY MEDIUM, AND DISPLAY DEVICE

CROSS-REFERENCE TO RELATED APPLICATIONS

This application is based on and claims priority under 35 USC 119 from Japanese Patent Application No. 2013-039683 filed Feb. 28, 2013.

BACKGROUND

1. Technical Field

The present invention relates to an electrophoretic particle, electrophoretic particle dispersion liquid, a display medium, and a display device.

2. Related Art

An electrophoretic type display medium has been investigated as a display having an image maintaining property (so-called a memory property). In the present display system, display is performed by alternately moving electrophoretic particles to a visible surface and a back surface in a cell (having a configuration in which two electrode substrates are overlapped to each other and electrophoretic materials are enclosed therebetween with a dispersion medium) by creating an electric field, using electrophoretic particles charged in liquid (electrophoretic particles).

SUMMARY

According to an aspect of the invention, there is provided an electrophoretic particle including a polymer having at least a reactive compound represented by the following Formula (I) as a polymerizable component, at least on a surface:

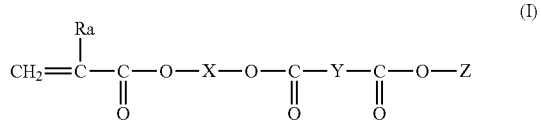

wherein in Formula (I), Ra represents a hydrogen atom or a methyl group; X represents a substituted or unsubstituted divalent hydrocarbon group; Y represents a substituted or unsubstituted divalent hydrocarbon group; and Z represents a hydrogen atom, or a substituted or unsubstituted monovalent hydrocarbon group.

BRIEF DESCRIPTION OF THE DRAWINGS

Exemplary embodiments of the present invention will be described in detail based on the following figures, wherein:

FIGS. 2A and 2B are explanatory diagrams schematically showing movement examples of particle groups when applying voltage to a portion between substrates of a display medium of a display device according to the exemplary embodiment.

DETAILED DESCRIPTION

Figure 1:
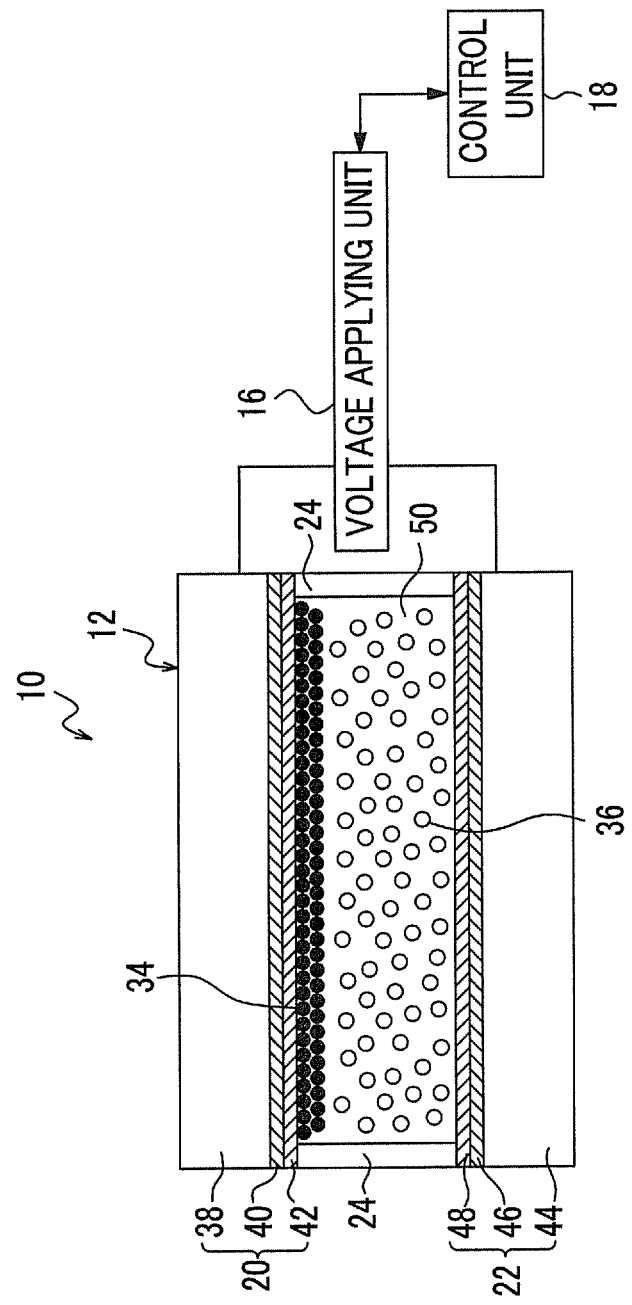
FIG. 1 is a schematic configuration diagram of a display device according to the exemplary embodiment.

Hereinafter, exemplary embodiments which are examples of the present invention will be described.

In the following description, a term "(meth)acrylic" means both "acrylic and methacrylic", a term "(meth)acrylo-" means both "acrylo- and methacrylo-", and a term "(meth)acrylate" means both "acrylate and methacrylate". These will be applied, hereinafter.

Electrophoretic Particles

Electrophoretic particles according to the exemplary embodiment include a polymer (hereinafter, referred to as a "specific polymer") having at least a reactive compound represented by Formula (I) as a polymerizable component, at least on a surface.

The electrophoretic particles according to the exemplary embodiment are electrophoretic particles having a large charging amount by the configuration described above. The reason for this is not clear, however, the following reasons may be considered.

First, a reactive compound represented by Formula (I) includes a (meth)acrylate group ((meth)acryloyl group) on one terminal, and includes a carbonyl group or an ester group thereof (carboxylic ester group) on the other terminal, and is, for example, a reactive product of a (meth)acrylic acid, diol, and dicarboxylic acid or a dicarboxylic ester. In addition, synthetic raw materials of the reactive compound represented by Formula (I) are not limited to the materials described above.

That is, the reactive compound represented by Formula (I) is acquired by linking a (meth)acrylate group contributing to polymerization reaction and a carbonyl group or an ester group thereof functioning as a charging group, through a portion having rotatable and flexible ester bonding. In addition, it is considered that the portion having the ether bonding has affinity with respect to a dispersion medium (for example, silicone oil or paraffinic hydrocarbon solvent) which disperses the electrophoretic particles.

In the reactive compound represented by Formula (I), the (meth)acrylate group contributing to the polymerization reaction and the carbonyl group or the ester group thereof functioning as a charging group are separated from each other, by the portion having an ether bonding.

Accordingly, if a specific polymer including at least the reactive compound represented by Formula (I) as a polymerizable component is present on a surface of the electrophoretic particle, it is considered that, in the dispersion medium, the carbonyl group or the ester group thereof functioning as a charging group is easily oriented on an outer side of the particles so as to be separated from the main chain of the polymer. Accordingly, it is considered that the carbonyl group or the ester group thereof easily exhibits the function as a charging group.

As described above, the electrophoretic particles according to the exemplary embodiment becomes electrophoretic particles having a large charging amount. In addition, the control of the charging amount may be easily performed by the amount of the specific polymer. As a result, voltage which starts movement by an electric field (hereinafter, this voltage is referred to as "threshold voltage") is also increased.

In a display medium and a display device employing the electrophoretic particles according to the exemplary embodiment, display with suppressed display problems (for example, decrease of display density and mixed color display) due to the decrease of the charging amount of the electrophoretic particles is realized.

The electrophoretic particles according to the exemplary embodiment have an excellent dispersion property even in a coexistent state with electrophoresis having the different charging polarity, and tend to have an excellent separation property. In addition, when being dispersed in the dispersion medium, the increase in viscosity also tends to be suppressed.

On the other hand, in the electrophoretic particles according to the exemplary embodiment, as the specific polymer included on the surface, if a polymer having at least a reactive compound represented by Formula (I) and a reactive compound having a silicone chain or an alkyl chain as polymerizable components, change in the charging amount due to repeated display is suppressed. The reason for this is not clear, however, it is considered because the silicone chain or the alkyl chain are easily oriented to outside of the particles by the reactive compound represented by Formula (I). In addition, since the silicone chain or the alkyl chain are easily oriented to outside of the particles, it is considered that the dispersion stability of the electrophoretic particles is also easily improved.

Hereinafter, the electrophoretic particles according to the exemplary embodiment will be described in detail.

For the electrophoretic particles according to the exemplary embodiment, a configuration including a core particle, and a specific polymer covered on or attached to a surface of the core particle is used, for example. That is, as the electrophoretic particles according to the exemplary embodiment, a configuration in which the surface of the core particle is subject to surface treatment with the specific polymer is used, for example. Particularly, in the configuration of covering the surface of the core particle or attaching to the surface thereof with the specific polymer, since the reactive compound represented by Formula (I) includes at least three (C=O) groups including that at a terminal, the specific polymer easily functions as an attached part and even coating and attachment of the specific polymer is easily realized.

Herein, the specific polymer may be covered or attached in a state of being bonded to the surface of the core particle (a functional group thereof), or may be covered or attached in a state of not being bonded to the surface of the core particle (a functional group thereof).

In addition, the electrophoretic particles according to the exemplary embodiment may be particles in which a colorant is dispersed in a specific polymer having at least the reactive compound represented by Formula (I) as a polymerizable component, or may be particles in which a the specific polymer is covered on or attached to the surface of the colorant.

Core Particle

The core particle is configured by containing a resin (hereinafter, referred to as a "resin of the core particle"), and a colorant, for example.

Resin of Core Particle

Examples of the resin of the core particle include resins including a homopolymer of styrenes such as styrene and chlorostyrene; mono-olefins such as ethylene, propylene, butylene, and isoprene; vinyl esters such as vinyl acetate, vinyl propionate, vinyl benzoate, and vinyl butyrate; α-methylene aliphatic monocarboxylic acid esters such as methyl acrylate, ethyl acrylate, butyl acrylate, dodecyl acrylate, octyl acrylate, phenyl acrylate, methyl methacrylate, ethyl methacrylate, butyl methacrylate, and dodecyl methacrylate; vinyl ethers such as vinyl methyl ether, vinyl ethyl ether, and vinyl butyl ether; vinyl ketones such as vinyl methyl ketone, vinyl hexyl ketone, and vinyl isopropenyl ketone, or copolymer thereof.

As the resin of the core particle, a cross-linked resin such as a cross-linked copolymer having divinylbenzene as a main component or cross-linked polymethylmethacrylate, a phenol resin, a urea resin, a melamine resin, a guanamine resin, a polyester resin, a silicone resin, and the like are used.

Examples of representative resins of the core particle include a polystyrene resin, a styrene-alkyl acrylate copolymer, a styrene-alkyl methacrylate copolymer, a styrene-acrylonitrile copolymer, a styrene-butadiene copolymer, a styrene-maleic anhydride copolymer, a polyethylene resin, a polypropylene resin, a polyester resin, a polyurethane resin, an epoxy resin, a silicone resin, a polyamide resin, a hydroxyalkyl-ammonium resin, modified rosin, paraffin wax, and the like.

In addition, the resin of the core particle may be a charging resin (resin having a charging group (for example, polarizing functional group: polar group)), or may be a non-charging resin (resin not having a charging group), however, from a viewpoint of improvement of the charging amount, the charging resin is preferable.

For example, the charging resin may preferably be a charging resin having at least a reactive compound having a charging group as a polymerizable component. For the reactive compound having a charging group, the reactive compound same as the reactive compound described as the polymerizable component of the specific polymer covered on the surface or attached to the surface of the core particle, is suitably used.

In the resin of the core particle, the reactive compound having a charging group is preferably from 1 mol % to 98 mol % and more preferably from 5 mol % to 95 mol %, by a molar ratio occupied with respect to the entire polymerizable components, for example.

The weight-average molecular weight of the resin of the core particle is preferably from 1,000 to 1,000,000, and more preferably from 10,000 to 200,000.

The weight-average molecular weight of the resin of the core particle is a value measured by gel permeation chromatography (GPC).

Colorant

As a colorant, an organic or inorganic pigment, or a oil-soluble dye is used, and for example, well-known colorants such as magnetic powder such as magnetite and ferrite, carbon black, titanium oxide, magnesium oxide, zinc oxide, a copper phthalocyanine cyan color material, an azo yellow color material, an azo magenta color material, quinacridone magenta color material, a red color material, a green color material, and a blue color material. In detail, as the colorants, aniline blue, chalco oil blue, chrome yellow, ultramarine blue, Dupont oil red, quinoline yellow, methylene blue chloride, phthalocyanine blue, malachite green oxalate, lamp black, Rose Bengal, C.I. Pigment Red 48:1, C.I. Pigment Red 122, C.I. Pigment Red 57:1, C.I Pigment Red 257, C.I. Pigment Yellow 97, C.I. Pigment Yellow 180, C.I. Pigment Yellow 185, C.I. Pigment Blue 15:1, C.I. Pigment Blue 15:3, and the like are used as representative examples. These colorants may be subjected to hydrophilic treatment or hydrophobic treatment on the surface thereof.

A combination amount of the colorant is preferably from 5% by weight to 99% by weight, and more preferably from 20% by weight to 70% by weight, with respect to the resin of the core particle.

Other Combination Materials

Other combination materials may be contained in the core particle.

The other combination materials may be a charge controlling material and a magnetic material, for example.

As the charge controlling material, a well-known material used for electrophotographic toner may be used, and cetyl pyrizyl chloride, quaternary ammonium salt such as BONTRON P-51, BONTRON P-53, BONTRON E-84, and BONTRON E-81 (all manufactured by Orient Chemical Industries Co., LTd.), a salicylic acid metal complex, phenolic condensate, a tetraphenyl compound, an oxidized metal particle, an oxidized metal particle subjected to surface treatment with various coupling agents, and the like are used, for example.

As the magnetic material, an inorganic magnetic material or an organic magnetic material subjected to color coating when necessary, is used. A transparent magnetic material, particularly a transparent organic magnetic material is more preferable than others, since it is difficult to disturb coloring of the coloring pigment and the specific weight thereof is smaller compared to that of the inorganic magnetic material.

As the colored magnetic material (color-coated material), coloring magnetic powder with a small diameter disclosed in JP-A-2003-131420 is used, for example. The coloring magnetic powder including a magnetic particle to be a core and a coloring layer laminated on the surface of the magnetic particle is used. As the coloring layer, coloring of the magnetic powder by the pigments to be opaque is selected, however, it is preferable to use an optical interference thin film, for example. This optical interference thin film is a thin film including an achromatic material such as $SiO_2$ or $TiO_2$ having a thickness same as a wavelength of light, and selectively reflects the wavelength of light by the optical interference in the thin film.

Preferred Configuration of Core Particle

The core particle described above is suitable to have a configuration of containing a resin including at least one of a nitrogen-containing group (for example, amino group and amide group) and hydroxyl group, as the resin of the core particle. If this resin is used, even coating or attachment of the specific polymer is easily realized.

As the resin, a styrene-acrylic resin, a hydroxy alkyl-ammonium resin, an acrylic resin, a polyamide resin, a polyamino resin (for example, a melamine resin, a guanamine resin), and the like are suitably used, for example. Those may be used alone as one kind or may be used in combination of two or more kinds.

Specific Polymer

The specific polymer is a polymer having at least the reactive compound represented by Formula (I) as a polymerizable component. In particular, the specific polymer may preferably be a polymer having at least the reactive compound represented by Formula (I) and the reactive compound having a silicone chain or an alkyl chain as polymerizable components.

Additionally, as the polymerizable components of the specific polymer, other polymerizable components of the reactive compound having a charging group, the reactive compound not having a charging group, and a reactive compound having a reactive group (cross-linking group) are also used.

Herein, in particular, if a reactive compound having a hydroxyl group is used as the other polymerizable component, it is suitable in a viewpoint of decreasing generation of anti-polar electrophoretic particles.

In addition, if a reactive compound having a fluorine group is used as the other polymerizable component, it is suitable in a viewpoint of easily realizing even covering and attachment of the specific polymer to the surface of the core particle. Further, the reactive compound having a fluorine group is suitable in terms of the fact that the polymerizable component of the reactive compound represented by Formula (I) is easily oriented to outer side of the electrophoretic particle, and also that aggregation between the electrophoretic particles is suppressed.

Reactive Compound Represented by Formula (I)

The reactive compound represented by Formula (I) is a polymerizable monomer represented by the following Formula.

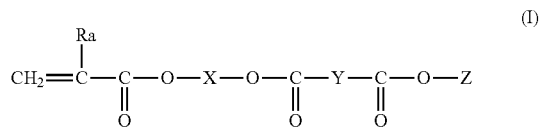

In Formula (I), Ra represents a hydrogen atom or a methyl group. X represents a substituted or unsubstituted divalent hydrocarbon group. Y represents a substituted or unsubstituted divalent hydrocarbon group. Z represents a hydrogen atom, or a substituted or unsubstituted monovalent hydrocarbon group.

As the divalent hydrocarbon group represented by X, for example, a divalent aliphatic hydrocarbon group, a divalent alicyclic hydrocarbon group, a divalent aromatic hydrocarbon group, or a group obtained by combination thereof is used.

The divalent aliphatic hydrocarbon group may be linear or branched, and for example, a group having carbon atoms of 1 to 50 (preferably 2 to 20) is used. In detail, a methylene group, an ethylene group, an isopropylene group, a butylene group, an isopentylene group, a pentylene group, a hexylene group, an octylene group, an ethyl hexylene group, an isononylene group, a decylene group, a pentadecanylene group, an icosanylene group, a tetracontanylene group, and the like are used, for example.

As the divalent alicyclic hydrocarbon group, for example, a group having carbon atoms of 5 to 20 (preferably 5 to 12) is used. In detail, a cyclopentyl group, a cyclohexylene group, a cycloheptylene group, a cyclopentenylene group, a cycloundecanylene group, a cyclododecanylene group, a cycloicosanylene group, and the like are used, for example.

As the divalent aromatic hydrocarbon group, a group having carbon atoms of 6 to 22 (preferably 6 to 14) is used, for example. In detail, a phenylene group, a biphenylene group, a terphenylene group, a naphthylene group, and the like are used, for example.

As a substituent substituting the divalent hydrocarbon group represented by X, a halogen group, a hydroxyl group, an amino group, an alkyl group, and the like are used, for example.

As the divalent hydrocarbon group represented by Y, a divalent aliphatic hydrocarbon group, a divalent alicyclic hydrocarbon group, a divalent aromatic hydrocarbon group, or a group obtained by combination thereof is used, for example. As the hydrocarbon group represented by Y, the same hydrocarbon group as the divalent hydrocarbon group represented by X is used. In addition, as the substituent substituting the divalent hydrocarbon group represented by Y, the same substituent as the substituent substituting the divalent hydrocarbon group represented X is used.

As the monovalent hydrocarbon group represented by Z, a monovalent aliphatic hydrocarbon group, a monovalent alicyclic hydrocarbon group, a monovalent aromatic hydrocarbon group, or a group obtained by combination thereof is used, for example.

The monovalent aliphatic hydrocarbon group may be linear or branched, and for example, a group having carbon atoms of 1 to 40 (preferably 1 to 22) is used. In detail, a methyl group, an ethyl group, an isopropyl group, a butyl group, an isopentyl group, a pentyl group, a hexyl group, an octyl group, an ethyl hexyl group, an isononyl group, a decyl group, a tridecyl group, a pentadecyl group, a tetracontyl group, and the like are used, for example.

As the monovalent alicyclic hydrocarbon group, a group having carbon atoms of 5 to 12 is used. In detail, a cyclopentyl group, a cyclohexyl group, a cycloheptyl group, a cyclopentenyl group, a cyclododecyl group, and the like are used, for example.

As the monovalent aromatic hydrocarbon group, a group having carbon atoms of 6 to 22 (preferably 6 to 14) is used, for example. In detail, a phenyl group, a biphenyl group, a terphenyl group, a naphthyl group, an anthracenyl group, a naphthacenyl group, a pentacenyl group, and the like are used, for example.

As a substituent substituting the monovalent hydrocarbon group represented by Z, a halogen group, a hydroxyl group, an amino group, an alkyl group, and the like are used, for example.

As the reactive compound represented by Formula (I), a reactive compound in which Ra represents a hydrogen atom or a methyl group, X represents an ethyl group or a propyl group, Y represents an ethyl group or a propyl group, and Z represents a hydrogen atom or a methyl group is suitably used.

Hereinafter, detailed examples of the reactive compound represented by Formula (I) will be shown, however, the examples thereof are not limited thereto.

2-acryloyloxyethyl succinate
2-methacryloyloxyethyl phthalic acid
2-methacryloyloxyethyl succinate
2-methacryloyloxypropyl succinate The reactive compound represented by Formula (I) is synthesized by reaction of (meth)acrylic acid, diol, and dicarboxylic acid or a dicarboxylic ester, as raw materials, for example.

Reactive Compound Having Silicone Chain or Alkyl Chain

Reactive Compound Having Silicone Chain

As the reactive compound having a silicone chain (a polymerizable monomer having a silicone chain), well-known compounds such as a linear silicone compound and a branched silicone compound are used. In particular, if the branched silicone compound is used, it is suitable in a viewpoint of easily suppressing fixing of the electrophoretic particles.

In addition, for the reactive compound having a silicone chain, a monomer may be used or a macromonomer may be used. This "macromonomer" is a collective term of an oligomer having a polymerizable functional group (degree of polymerization is about 2 to 300) or a polymer, and includes both properties of a polymer and a monomer. In addition, the reactive compound having a silicone chain may be used alone or in combination of plural kinds.

As the linear silicone compound, a dimethyl silicone compound having a (meth)acrylate group on a terminal (a silicone compound represented by the following Structural Formula (1), for example, Silaplane: FM-0711, FM-0721, FM-0725, and the like manufactured by JNC Corporation, X-22-174DX, X-22-2426, X-22-2475, and the like manufactured by Shin-Etsu Chemical Co., Ltd.) is used, for example.

As the branched silicone compound, silicone compounds represented by the following Structural Formulae (2) to (7) are used, for example.

Structural Formula (1)

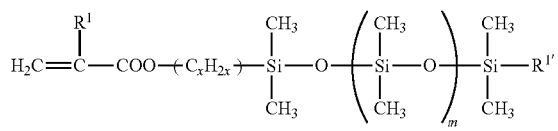

In Structural Formula (1), $R^1$ represents a hydrogen atom or a methyl group. $R^{1'}$ represents a hydrogen atom or an alkyl group having 1 to 4 carbon atoms. m represents a natural number (for example, from 1 to 1,000, and preferably from 3 to 100). x represents an integer from 1 to 3.

Structural Formula (2)

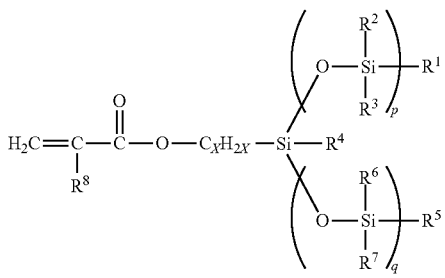

Structural Formula (3)

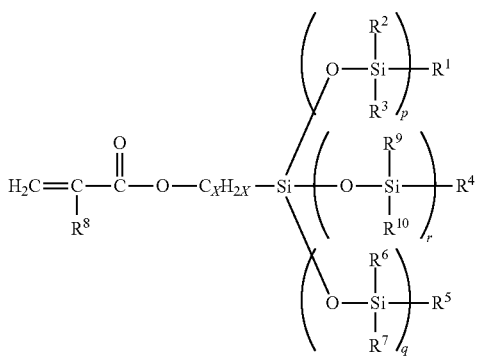

Structural Formula (4)

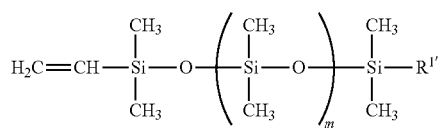

Structural Formula (5)

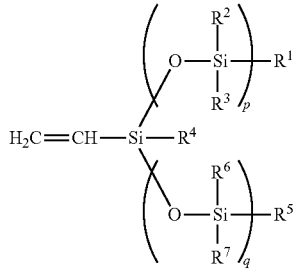

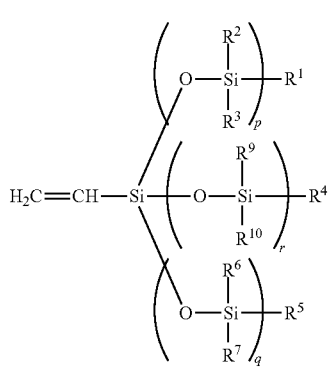

Structural Formula (6)

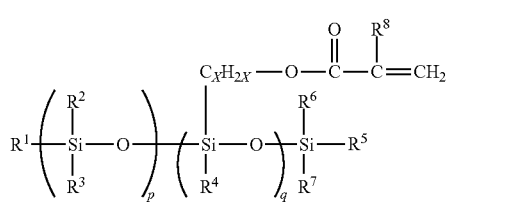

Structural Formula (7)

methyl group, p and q each independently be an integer from 1 to 5, and x be an integer from 1 to 3.

As the silicone compound represented by Structural Formula (2), MCS-M11 and MFS-M15, manufactured by Gelest Inc. are used, for example. As the silicone compound represented by Structural Formula (3), RTT-1011 manufactured by Gelest Inc., X22-2404 manufactured by Shin-Etsu Chemical Co., Ltd. are used, for example. As the silicone compound represented by Structural Formula (4), MCR-V21 manufactured by Gelest Inc. is used, for example. As the silicone compound represented by Structural Formula (5), MCS-V12 manufactured by Gelest Inc. is used, for example. As the silicone compound represented by Structural Formula (6), VTT-106 manufactured by Gelest Inc. is used, for example. As the silicone compound represented by Structural Formula (7), RMS-044, RMS-033, and RMS-083 manufactured by Gelest Inc. are used, for example. Hereinafter, representative structural formulae of the silicone compounds will be shown.

MCS-M11

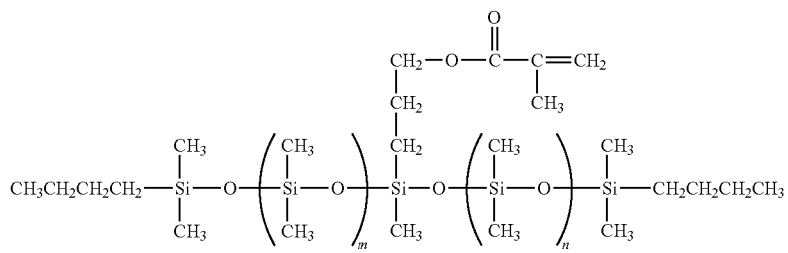

In Structural Formulae (2), (3), (5), (6), and (7), $R^1$, $R^2$, $R^3$, $R^4$, $R^5$, $R^6$, $R^7$, $R^9$, and $R^{10}$ each independently represent a hydrogen atom, an alkyl group having 1 to 4 carbon atoms, or a fluoroalkyl group having 1 to 4 carbon atoms. $R^8$ represents a hydrogen atom or a methyl group. p, q, and r each independently represent an integer from 1 to 1,000. x represents an integer from 1 to 3.

In Structure Formula (4), $R^{1'}$ represents a hydrogen atom or an alkyl group having 1 to 4 carbon atoms. m represents a natural number (for example, from 1 to 1000, and preferably from 3 to 100). x represents an integer from 1 to 3.

In the silicone compounds represented by Structure Formulae (2) and (5), it is preferable that $R^1$ and $R^5$ be butyl groups, $R^2$, $R^3$, $R^4$, $R^6$, and $R^7$, be methyl groups, $R^8$ be a methyl group, p and q each independently be an integer from 1 to 5, and x be an integer from 1 to 3.

In the silicone compounds represented by Structural Formulae (3) and (6), it is preferable that $R^1$, $R^2$, $R^3$, $R^4$, $R^5$, $R^6$, $R^7$, $R^9$, and $R^{10}$ be methyl groups, $R^8$ be a hydrogen atom or a methyl group, p, q and r each independently be an integer from 1 to 3, and x be an integer from 1 to 3.

In the silicone compound represented by Structural Formula (7), it is preferable that $R^1$, $R^2$, $R^3$, $R^4$, $R^5$, $R^6$, $R^7$, $R^9$, and $R^{10}$ be methyl groups, $R^8$ be a hydrogen atom or a In the structural formula of MCS-M11, m and n each independently represent an integer from 2 to 4, and molecular weight thereof is from 800 to 1,000.

RTT-1011

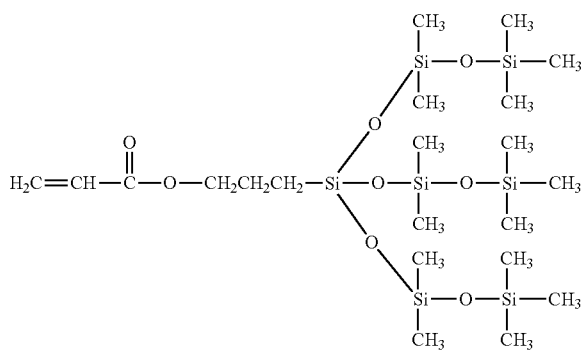

RTT-1011 is a compound represented by the above structural formula.

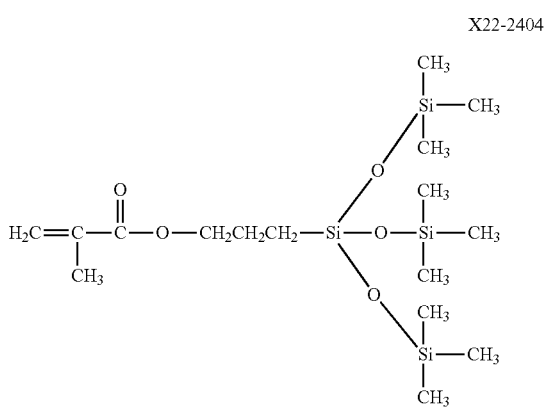

X22-2404

X22-2404 is a compound represented by the above structural formula.

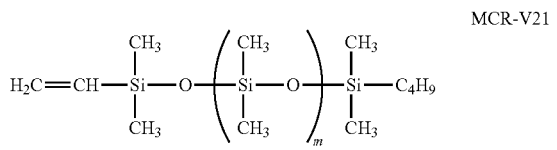

MCR-V21

In the structural formula of MCR-V21, m is an integer from 72 to 85, and molecular weight thereof is from 5500 to 6500.

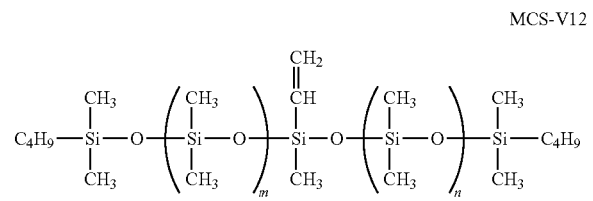

MCS-V12

In the structural formula of MCS-V12, m and n are integers from 6 to 10, and molecular weight thereof is from 1200 to 1400.

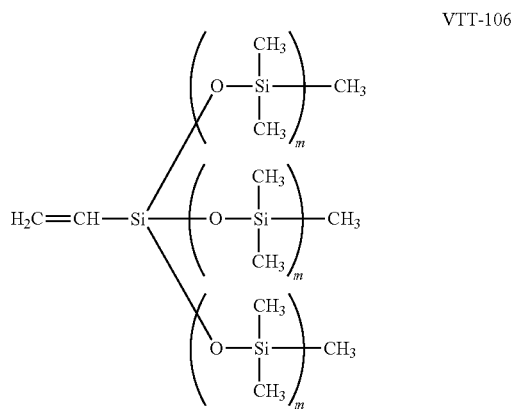

VTT-106

(CAS: [126581-51-9]TSCA)

VTT-106 is a compound represented by the above structural formula.

Reactive Compound Having Alkyl Chain

An example of the reactive compound having an alkyl chain (polymerizable monomer having an alkyl chain) includes ester (meth)acrylate, and detailed examples thereof include methyl (meth)acrylate, butyl (meth)acrylate, hexyl (meth)acrylate, octyl (meth)acrylate, dodecyl (meth)acrylate, stearyl (meth)acrylate, 2-ethylhexyl (meth)acrylate, and the like. Among them, ester (meth)acrylate having a long alkyl chain, in detail, an alkyl chain having 4 to 30 carbon atoms, is preferable, for example.

Reactive Compound Having Charging Group

As the reactive compound having a charging group (a polymerizable monomer having a charging group), a reactive compound having base or an acid group as a charging group (for example a polar group; polarizing functional group) is used.

For the base (hereinafter, cationic group) as the charging group, an amino group, and quaternary ammonium group are used, for example (including salts of the groups). These cationic groups tend to give positive charging polarity to particles, for example.

For the acid group (hereinafter, anionic group) as the charging group, a phenol group, a carboxyl group, a carboxylic salt group, a sulfonic acid group, a sulfonic acid salt group, a phosphoric acid group, a phosphoric acid salt group, and a tetraphenylboron group are used, for example (including salts of the groups). These anionic groups tend to give negative charging polarity to particles, for example.

Additionally, as the charging groups, a fluorine group, a phenyl group (particularly, phenoxy group), and a hydroxyl group are also used.

Herein, since the electrophoretic particle according to the exemplary embodiment is preferably the negative charging electrophoretic particle, the reactive compound having a charging group (for example, an anionic group, a fluorine group, a hydroxyl group, or the like) which tends to give negative charging polarity may be preferably used.

As the polymerizable components having a cationic group (hereinafter, cationic polymerizable components), the following components are used, for example. In detail, (meth)acryltes having an aliphatic amino group such as N,N-dimethylaminoethyl (meth)acrylate, N,N-diethylaminoethyl (meth)acrylate, N,N-dibutylaminoethyl (meth)acrylate, N,N-hydroxyethylaminoethyl (meth)acrylate, N-ethylaminoethyl (meth)acrylate, N-octyl-N-ethylaminoethyl (meth)acrylate, and N,N-dihexylaminoethyl (meth)acrylate; aromatic substituted ethylene monomers having a nitrogenous group such as dimethyl amino styrene, diethylamino styrene, dimethyl amino methyl styrene, and dioctylamino styrene; nitrogenous vinyl ether monomers such as vinyl-N-ethyl-N-phenylaminoethylether, vinyl-N-butyl-N-phenylaminoethylether, triethanolamine divinylether, vinyldiphenylamino ethylether, N-vinylhydroxyethyl benzamide, and m-aminophenylvinylether; pyrrols such as vinylamine and N-vinylpirrol; pyrrolines such as N-vinyl-2-pyrroline and N-vinyl-3-pirroline; pyrrolidines such as N-vinyl pyrrolidine, vinyl pyrrolidine aminoether, and N-vinyl-2-pyrrolidone; imidazoles such as N-vinyl-2-methylimidazole, imidazolines such as N-vinylimidazoline; indoles such as N-vinylindole; indolines such as N-vinylindoline; carbazoles such as N-vinylcarbazoles and 3,6-dibrome-N-vinylcarbazole; pyridines such as 2-vinylpyridine, 4-vinylpyridine, and 2-methyl-5-vinylpyridine; piperidines such as (meth)acrylic piperidine, N-vinylpiperidone, and N-vinylpiperadine; quinolines such as 2-vinylquinoline and 4-vinylquinoline; pyrazoles such as N-vinylpyrazole and N-vinylpyrazoline;

oxazoles such as 2-vinyloxazole; and oxadines such as 4-vinyloxadine and morpholino ethyl (meth)acrylate are used.

The cationic polymerizable components may form a salt structure by quaternary ammonium chloridation before polymerization or after polymerization. The quaternary ammonium chloridation is realized by reaction of the cationic group with alkyl halides or ester tosylates, for example.

As the polymerizable component having an anionic group (hereinafter, anionic polymerizable components), polymerizable components having a carboxylic acid group, polymerizable components having a sulfonic acid group, and polymerizable components having a phosphoric acid group are used, for example.

Examples of the polymerizable components having a carboxylic acid group include (meth)acrylic acid, crotonic acid, itaconic acid, maleic acid, fumaric acid, citraconic acid, anhydride thereof, vinyl esters having a carboxyl group such as monoalkyl ester, carboxy ethyl vinyl ether, or carboxy propyl vinyl ether, and salts thereof.

Examples of the polymerizable components having a sulfonic acid group include styrene sulfonate, 2-acrylamide-2-methylpropane sulfonate, 3-sulfopropyl (meth)acrylic acid ester, bis-(3-sulfopropyl)-itaconic acid ester, and salts thereof. Additionally, as the polymerizable components having a sulfonic acid group, vitriolic monoester of 2-hydroxyethyl (meth)acrylate and salts thereof are used.

Examples of the polymerizable components having a phosphoric acid group include vinyl phosphonate, vinyl phosphate, acid phosphoxy ethyl (meth)acrylate, acid phosphoxypropyl (meth)acrylate, bis(methacryloxyethyl)phosphate, diphenyl-2-methacryloyloxyethyl phosphate, diphenyl-2-acryloyloxyethyl phosphate, dibutyl-2-methacryloyloxyethyl phosphate, dibutyl-2-acryloyloxyethyl phosphate, dioctyl-2-(meth) acryloyloxyethyl phoasphare, and the like.

The anionic polymerizable components may form a salt structure by ammonium chloridation before polymerization or after polymerization. The ammonium chloridation, for example, is realized by reaction of the anionic group with tertiary amines or quaternary ammonium hydroxides.

An example of the polymerizable component having a fluorine group includes a (meth)acrylate monomer having a fluorine group, and detailed examples thereof include trifluoroethyl (meth)acrylate, pentafluoropropyl (meth)acrylate, perfluoroethyl (meth)acrylate, perfluorobutyl ethyl (meth)acrylate, perfluorooctylethyl (meth)acrylate, perfluorodecylethyl (meth)acrylate, trifluoromethyltrifluoroethyl (meth)acrylate, hexafluorobutyl (meth)acrylate, and the like.

Examples of the polymerizable components having a phenyl group (particularly a phenoxy group) include styrene, phenoxyethylene glycol (meth)acrylate, phenoxy polyethylene glycol (meth)acrylate, 2-hydroxy-3-phenoxypropyl (meth)acrylate, phenoxyethylene glycol (meth)acrylate, and the like.

Examples of the polymerizable components having a hydroxyl group include hydroxyalkyl (meth)acrylate (for example, hydroxylmethyl (meth)acrylate, hydroxyethyl (meth)acrylate, and hydroxypropyl (meth)acrylate), allyl alcohol, cyclohexane dimethanol monoacrylate, polyethylene glycol mono(meth)acrylate, and the like, and a component obtained by ring opening after the copolymerization of the monomer having a glycidyl group, or a component to which an OH group is introduced by hydrolysis after the polymerization of the monomer having t-butoxy is additionally used.

Reactive Compound not Having Charging Group

As the reactive compound not having a charging group (polymerizable monomer not having a charging group), non-ionic polymerizable components are used, and examples thereof include (meth)acrylonitrile, alkylester (meth)acrylate, (meth)acrylamide, ethylene, propylene, butadiene, isoprene, isobutylene, N-dialkyl substituted (meth)acrylamide, vinyl carbazole, vinyl chloride, vinylidene chloride, vinyl pyrrolidone, and the like.

Reactive Compound Having Reactive Group (Cross-Linking Group)

Examples of the reactive compound having a reactive group (cross-linking group) (polymerizable monomer having a reactive group (cross-linking group)) include glycidyl (meth)acrylate having an epoxy group, an isocyanate monomer having an isocyanate group (for example, SHOWA DENKO K.K: Karenz AOI (2-isocyanate ethyl acrylate), and Karenz MOI (2-isocyanate ethyl methacrylate)), and an isocyanate monomer having a blocked isocyanate group (for example, SHOWA DENKO K.K: Karenz MOI-BM (2-(O-[1'-methylpropylidene amino]carboxyamino) ethyl methacrylate), and Karenz MOI-BP (2-[(3,5-dimethylpyrazolyl) carbonylamino]ethyl methacrylate)).

In the blocked isocyanate group, for example, the isocyanate group is in a state of being reacted with a substituent, and the isocyanate group is in a state of being reacted with a substituent separated by heating. Accordingly, the reactivity of the isocyanate group is suppressed and the isocyanate group is in a state of reacting if the substituent is separated by the heating.

If the reactive compound having a reactive group as a polymerizable component of the specific polymer is used, the specific polymer is covered on or attached to the surface of the core particle in a state where the specific polymer itself is cross-linked. In addition, the specific polymer is covered on or attached to the surface of the core particle, in a state where the reactive group of the reactive compound having the reactive group is bonded with the functional group on the surface of the core particle.

Ratio of Polymerizable Component of Specific Polymer

A copolymerization ratio of the reactive compound represented by Formula (I) is preferably from 1% to 50%, and more preferably from 3% to 30%, by a molar ratio with respect to the entire polymerizable components.

A copolymerization ratio of the reactive compound having a silicone chain or an alkyl chain is preferably from 0% to 99%, and more preferably from 10% to 85%, by a molar ratio with respect to the entire polymerizable components.

A copolymerization ratio of the reactive compound having a charging group is preferably from 0% to 50%, and more preferably from 1% to 30%, by a molar ratio with respect to the entire polymerizable components.

A copolymerization ratio of the reactive compound not having a charging group is preferably from 0% to 80%, and more preferably from 0% to 50%, by a molar ratio with respect to the entire polymerizable components.

A copolymerization ratio of the reactive compound having a reactive group (cross-linking group) is preferably from 0% to 50%, and more preferably from 3% to 40%, by a molar ratio with respect to the entire polymerizable components.

Herein, in particular, a copolymerization ratio of the reactive compound having a hydroxyl group is preferably from 0% to 50%, and more preferably from 5% to 30%, by a molar ratio with respect to the entire polymerizable components.

On the other hand, a copolymerization ratio of the reactive compound having a fluorine group is preferably from 0% to 30%, and more preferably from 1% to 10%, by a molar ratio with respect to the entire polymerizable components.

Properties of Specific Polymer

The weight-average molecular weight of the specific polymer is preferably from 500 to 1,000,000, and more preferably from 1,000 to 1,000,000.

The weight-average molecular weight of the specific polymer is a value measured by gel permeation chromatography (GPC).

The amount of the specific polymer covered or attached with respect to the surface of the core particle is from 0.00001% by weight to 50% by weight, and preferably from 0.0001% by weight to 10% by weight, with respect to the core particle.

Preferable Configuration of Specific Polymer

As the specific polymer described above, 1) a copolymer obtained by copolymerization of the reactive compound represented by Formula (I), the reactive compound having a silicone chain or an alkyl chain, the reactive compound having a hydroxyl group, and the reactive compound having a fluorine group, 2) a copolymer obtained by copolymerization of the reactive compound represented by Formula (I), the reactive compound having a silicone chain or an alkyl chain, the reactive compound having a hydroxyl group, the reactive compound having a phenoxy group, and the reactive compound having a fluorine group, 3) a copolymer obtained by copolymerization of the reactive compound represented by Formula (I), the reactive compound having a silicone chain or an alkyl chain, the reactive compound having a hydroxyl group, and the reactive compound having a phenoxy group, and 4) a copolymer obtained by copolymerization of the reactive compound represented by Formula (I), the reactive compound having a silicone chain or an alkyl chain, the reactive compound having a hydroxyl group, the reactive compound having an amino group, and the reactive compound having a fluorine group are particularly preferable.

Properties of Electrophoretic Particle

An average particle size (volume average particle size) of the electrophoretic particles according to the exemplary embodiment is from 0.1 μm to 10 μm, for example, however, it is selected depending on the intended use and there are no limits.

The average particle size is measured using Photal FPAR-1000 (a dynamic light scattering type particle size distribution measuring device) manufactured by Otsuka Electronics Co., Ltd., and analysis is performed by a MARQUARDT method.

Method of Manufacturing Electrophoretic Particle

As an example of the method of manufacturing the electrophoretic particle according to the exemplary embodiment, the following manufacturing method is used, however, it is not limited thereto.

First, the resin of the core particle, the colorant, and the other combination materials are mixed into a first solvent, and the mixed liquid in which the resin of the core particle is dissolved, is manufactured.

Herein, the first solvent is a good solvent which may form dispersion phases in a second solvent (poor solvent which may form continuous phases) which will be described, has a lower boiling point than that of the second solvent, and is selected from solvent for dissolving the resin of the core particle.

As the first solvent, water, isopropyl alcohol (IPA), methanol, ethanol, butanol, tetrahydrofuran, ethyl acetate, butyl acetate, and the like are used, for example.

Next, the obtained mixed liquid is mixed and stirred with the second solvent, and the mixed liquid is emulsified with the second solvent as a continuous phase, to prepare emulsified liquid.

The first solvent in the emulsified liquid is removed (dried) by heating or the like, the resin of the core particle is precipitated, and the core particle (core particle dispersed in the second solvent) is obtained as a particulate material containing the colorant and the other combination materials with the resin of the core particle.

Herein, the second solvent is a poor solvent which may form continuous phases with respect to the first solvent which forms the dispersion phases, has a high boiling point than that of the first solvent, and is selected from solvents in which the resin of the core particle is not dissolved.

As the second solvent, a dispersion medium for dispersing the obtained electrophoretic particle is used, for example.

Next, the specific polymer is mixed to a third solvent to prepare mixed liquid in which the specific polymer is dissolved.

Herein, the third solvent is a good solvent which may form dispersion phases in the second solvent (poor solvent which may form continuous phases), has a lower boiling point than that of the second solvent, and is selected from solvents in which the specific polymer is dissolved. In addition, the third solvent may preferably be selected from solvents in which the resin of the core particle is not dissolved.

Also as the third solvent, water, isopropyl alcohol (IPA), methanol, ethanol, butanol, tetrahydrofuran, ethyl acetate, butyl acetate, and the like are used, for example.

Next, the obtained mixed liquid is mixed and stirred with the second solvent in which the core particle is dispersed, and the mixed liquid is emulsified with the second solvent as a continuous phase to prepare emulsified liquid.

Then, the third solvent in the emulsified liquid is removed (dried) by heating or the like, and the specific polymer is precipitated on the surface of the core particle and is covered or attached onto the surface of the core particle.

As described above, an electrophoretic particle in which the specific polymer is covered or attached onto the surface of the core particle is obtained, and an electrophoretic particle dispersion liquid containing the electrophoretic particle is obtained.

Herein, the obtained electrophoretic particle dispersion liquid may be diluted by a dispersion medium (solvent), for example, if necessary. In addition, to obtain electrophoretic particle dispersion liquid containing two or more kinds of electrophoretic particles, each dispersion liquid may be prepared and then mixed thereto.

Electrophoretic Particle Dispersion Liquid

The electrophoretic particle dispersion liquid according to the exemplary embodiment includes a particle group including the electrophoretic particle according to the exemplary embodiment and a dispersion medium for dispersing the particle group.

The electrophoretic particle dispersion liquid according to the exemplary embodiment may have a configuration including a particle group including a negative charging electrophoretic particle, and a particle group including a positive charging electrophoretic particle. In this case, the negative charging electrophoretic particle may preferably be the electrophoretic particle according to the exemplary embodiment.

On the other hand, the positive charging electrophoretic particle is configured to include a core particle, and a polymer covered or attached onto the surface of the core particle, for example.

The core particle is configured to contain a resin and a colorant, for example. As the configuration of the core particle, the same configuration as the core particle described in the electrophoretic particle according to the exemplary embodiment is used. However, in a case of applying the charging resin as the resin, the charging resin, for example, may preferably include at least a reactive compound having a group which tends to give positive charging polarity to the particle (for example, a cationic group and a phenoxy group) as the charging group, as a polymerizable component, for example.

As the polymer, a polymer having at least the reactive compound having a charging group as a polymerizable component is used, for example. However, for the reactive compound having a charging group, a reactive compound having a group which tends to give positive charging polarity to the particle (for example, a cationic group and a phenoxy group) as the charging group, may preferably be used. In particular, a reactive compound having at least one of a phenoxy group and an amino group is preferable, and a reactive compound having a phenoxy group is more preferable. If the reactive compound having a phenoxy group is used, the dispersion stability of the electrophoretic particle of each polarity easily improves.

Herein, as the reactive compound having a charging group, if a reactive compound having a hydroxyl group is used, other than the reactive compound having a group which tends to give positive charging polarity to the particle, it is suitable in a viewpoint of decreasing generation of anti-polar electrophoretic particles. In addition, as the reactive compound having a charging group, if a reactive compound having a fluorine group is used, other than the reactive compound having a group which tends to give positive charging polarity to the particle, it is suitable for easily realizing even covering or attachment of the specific polymer onto the surface of the core particle. Further, the reactive compound having a fluorine group is suitable in a viewpoint of suppressing aggregation between the electrophoretic particles. The reactive compound having a hydroxyl group or a fluorine group may be used preferably in a range of not disturbing the positive charging property.

The polymer may be a polymer having the reactive compound having a silicone chain or an alkyl chain, the reactive compound not having a charging group, and the reactive compound having a reactive group (cross-linking group) as copolymerizable components, if necessary.

For each reactive compound of the polymer, the same reactive compounds described in the electrophoretic particle according to the exemplary embodiment are used.

The configuration of the positive charging electrophoretic particle is not limited to the above-described configuration, and may be a well-known configuration.

The dispersion medium is not particularly limited, however, it is preferable to select a low dielectric solvent (for example, having a dielectric constant of equal to or less than 5.0, preferably equal to or less than 3.0). The dispersion medium may be used with the solvent other than the low dielectric solvent, however, a low dielectric solvent with equal to or more than 50% by volume is preferably contained. In addition, the dielectric constant of the low dielectric solvent is measured by a permittivity meter (manufactured by Nihon Rufuto Co., Ltd.).

As the low dielectric solvent, petroleum high-boiling-point solvents such as a paraffinic hydrocarbon solvent, silicone oil, and fluoric liquid are used.

The low dielectric solvent may preferably be selected according to kinds of the polymerizable components of the specific polymer of the electrophoretic particle, for example. In detail, in a case of applying the reactive compound having a silicone chain as the polymerizable components of the specific polymer, the silicone oil may preferably be selected as the dispersion medium. In addition, in a case of applying the reactive compound having an alkyl chain as the polymerizable components of the specific polymer, the paraffin hydrocarbon solvent may preferably be selected as the dispersion medium.

However, it is not limited thereto, and even in a case of applying the component having a silicone chain as the polymerizable components of the specific polymer, the paraffin hydrocarbon solvent may be selected as the dispersion medium.

In detail as the silicone oil, silicone oil in which the hydrocarbon group is bonded to the siloxane bond (for example, dimethyl silicone oil, diethyl silicone oil, methylethyl silicone oil, methylphenyl silicone oil, diphenyl silicone oil, or the like) is used. Among them, dimethyl silicone is particularly preferable.

As the paraffin hydrocarbon solvent, normal paraffin hydrocarbon and isoparaffin hydrocarbon having 20 or more carbon atoms (boiling point of equal to or higher than 80° C.) are used, and isoparaffin is preferable for reasons of stability and volatility. In detail, SHELLSOL 71 (manufactured by Showa Shell Sekiyu K.K.), Isopar O, Isopar H, Isopar K, Isopar L, Isopar G, and Isopar M (Isopar is a product name of Exxon Mobil Corporation) or IPSolvent (manufactured by Idemitsu Petrochemical Co., Ltd.) is used.

If necessary, acid, alkali, salt, a dispersant, a dispersion stabilizer, a stabilizer for oxidation prevention or ultraviolet light absorption, an antimicrobial agent, or an antiseptic agent may be added to the electrophoretic particle dispersion liquid according to the exemplary embodiment. In addition, a charge-controlling agent may be added to the electrophoretic particle dispersion liquid according to the exemplary embodiment.

Concentration of the electrophoretic particles in the electrophoretic particle dispersion liquid according to the exemplary embodiment is selected depending on the display properties or responsive properties or the usage thereof, however, it is preferable to select the concentration in a range from 0.1% by weight to 30% by weight. In a case of mixing particles having different colors, the total amount of the particles is preferable to be in the range described above.

The electrophoretic particle dispersion liquid according to the exemplary embodiment is used for an electrophoretic type display medium, an electrophoretic type dimming medium (dimming element), and a liquid toner of a liquid development type electrophotographic system. As the electrophoretic type display medium and the electrophoretic type dimming medium (dimming element), a well-known system of moving the particle group to an opposing direction of an electrode (substrate) surface, the other system of moving the particle group to a direction along an electrode (substrate) surface (so-called an in-plane type element), or a hybrid element combining the systems described above, are used.

In addition, in the electrophoretic particle dispersion liquid according to the exemplary embodiment, if plural particles having different colors or charging polarities are mixed and used as the electrophoretic particles, color display is realized.

Display Medium and Display Device

Examples of a display medium and a display device according to the exemplary embodiment will be described.

FIG. 1 is a schematic configuration diagram of a display device according to the exemplary embodiment. FIGS. 2A and 2B are explanatory diagrams schematically showing movement examples of particle groups when applying voltage to a portion between substrates of a display medium of a display device according to the exemplary embodiment.

In a display device 10 according to the exemplary embodiment, the electrophoretic particle dispersion liquid according to the exemplary embodiment is applied as particle dispersion liquid containing a dispersion medium 50 and a particle group 34 of a display medium 12. That is, the electrophoretic particles according to the exemplary embodiment are dispersed in the dispersion medium 50 as the particle group 34. In detail, the particle group 34 includes particle groups 34A, and particle groups 34B which represents a color different from that of the particle groups 34A and have the different charging polarity, and among them, the electrophoretic particles according to the exemplary embodiment are applied as the particles constituting the particle group charged to negative polarity (particle group 34A in the exemplary embodiment).

As shown in FIG. 1, the display device 10 according to the exemplary embodiment includes the display medium 12, a voltage applying unit 16 which applies voltage to the display medium 12, and a control unit 18.

The display medium 12 includes a display substrate 20 which is set as an image display surface, a back surface substrate 22 which opposes the display substrate 20 with a space interposed therebetween, a space member 24 which holds a specific space between the substrates and partitions the part between the display substrate 20 and the back surface substrate 22 to plural cells, and a reflective particle group 36 which includes an optical reflective property different from that of the particle group 34 enclosed in each cell.

The cell described above shows a region surrounded by the display substrate 20, the back surface substrate 22, and the space member 24. In the cell, the dispersion medium 50 is enclosed. The particle group 34 is configured with plural particles, is dispersed in the dispersion medium 50, and moves (migrates) between substrates of the display substrate 20 and the back surface substrate 22 according to electric field intensity formed in the cell through a space of the reflective particle group 36.

In addition, the display medium 12 may be configured so as to perform display for each pixel by providing the space member 24 so as to correspond to each pixel at the time of displaying an image on the display medium 12 and forming the cell so as to correspond to each pixel.

In addition, in the exemplary embodiment, for convenience of description, the exemplary embodiment will be described using a diagram focused on one cell. Hereinafter, each configuration will be described in detail.

First, a pair of substrates will be described.

The display substrate 20 has a configuration in which a surface electrode 40 and a surface layer 42 are laminated on a support substrate 38, in this order. The back surface substrate 22 has a configuration in which a back surface electrode 46 and a surface layer 48 are laminated on a support substrate 44.

The display substrate 20 or both of the display substrate 20 and the back surface substrate 22 have translucency. Herein, the translucency of the exemplary embodiment means transmittance of visible light of equal to or more than 60%.

As a material of the support substrate 38 and the support substrate 44, glass or plastic, for example, a polyethylene terephthalate resin, polycarbonate resin, an acrylic resin, a polyimide resin, a polyester resin, an epoxy resin, or a polyether sulfonic resin is used.

As a material of the surface electrode 40 and the back surface electrode 46, an oxide of indium, tin, cadmium, or antimony, a composite oxide such as ITO, metal such as gold, silver, copper, or nickel, or organic materials such as polypyrrole or polythiophene. The surface electrode 40 and the back surface electrode 46 may be any of a single-layered film, a mixed film, or a composite film thereof. The thickness of the surface electrode 40 and the back surface electrode 46 may preferably be from 100 Å to 2000 Å, for example. The surface electrode 40 and the back surface electrode 46 may be formed in a matrix or in a stripe shape, for example.

The surface electrode 40 may be embedded in the support substrate 38. In addition, the back surface electrode 46 may be embedded in the support substrate 44. In this case, the materials of the support substrate 38 and the support substrate 44 are selected according to the composition of each particle of the particle group 34 or the like.

The back surface electrode 46 and the surface electrode 40 may be separated from the display substrate 20 and the back surface substrate 22, respectively, and may be disposed outside of the display medium 12.

In the above description, the case of including electrodes (surface electrode 40 and back surface electrode 46) on both the display substrate 20 and the back surface substrate 22 has been described, however, the electrode may be provided on only one substrate and active matrix driving may be performed.

In addition, to execute active matrix driving, the support substrate 38 and the support substrate 44 may include a thin film transistor (TFT) for each pixel. The TFT may preferably be included in the back surface substrate 22, not in the display substrate.

Next, surface layers will be described.

The surface layer 42 and the surface layer 48 are formed on the surface electrode 40 and the back surface electrode 46, respectively. As the materials constituting the surface layer and the surface layer 48, polycarbonate, polyester, polystyrene, polyimide, epoxy, polyisocyanate, polyamide, polyvinyl alcohol, polybutadiene, polymethyl methacrylate, copolyamide, an ultraviolet light curable acrylic resin, a fluorine resin, and the like are used.

The surface layer 42 and the surface layer 48 may be configured by containing the resins and charge transporting materials, and may be configured by containing self-supporting resins having a charge transporting property.

Next, the space member will be described.

The space member 24 for holding a gap between the surfaces of the display substrate 20 and the back surface substrate 22 is configured with a thermoplastic resin, a thermosetting resin, an electron beam curable resin, a light curing resin, rubber, metal, or the like, for example.

The space member 24 may be integrated with any one of the display substrate 20 ad the back surface substrate 22. In this case, the support substrate 38 or the support substrate 44 is manufactured by performing an etching process for etching, a laser machining process, a press process or printing process using a pre-manufactured mold.

In this case, the space member 24 is manufactured on any one side or both sides of the display substrate 20 side and the back surface substrate 22 side or both thereof.

The space member 24 may be colored or colorless, however a clear and transparent space member is preferable and in this case, the space member is configured with a transparent resin such as polystyrene, polyester, or acryl.

In addition, the particulate space member 24 is also preferably transparent, and glass particles are also used, other than the transparent resin particles such as polystyrene, polyester or acryl.

"transparent" means that transmittance is equal to or more than 60% with respect to the visible light.

Next, the reflective particle group will be described.

The reflective particle group 36 is configured from reflective particles having an optical reflective property different from the particle group 34, and functions as a reflective member which displays a color different from that of the particle group 34. The reflective particle group functions as a gap member for movement, without disturbing the movement between the substrates of the display substrate 20 and the back surface substrate 22. That is, each particle of the particle group 34 is moved to the display substrate 20 side from the back surface substrate 22 side, or to the back surface substrate 22 side from the display substrate 20 side, through the space of the reflective particle group 36. As the color of the reflective particle group 36, the white or black may preferably be selected so as to be a background color, for example, but the other color may be selected. The reflective particle group 36 may be the non-charged particle group (that is, a particle group which does not move according to the electric field), or may be the charged particle group (a particle group which moves according to the electric field). In addition, in the exemplary embodiment, the case where the reflective particle group 36 is non-charged particle group and white has been described, however, it is not limited thereto.

As particles of the reflective particle group 36, particles obtained by dispersing a white pigment (for example, titanium oxide, silicon oxide, or zinc oxide) in a resin (for example, a polystyrene resin, a polyethylene resin, a polypropylene resin, a polycarbonate resin, a polymethyl methacrylate resin (PMMA), an acrylic resin, a phenol resin, or a formaldehyde condensate), or resin particles (for example, polystyrene particles, polyvinylnaphthalene particles, or bismelamine particles) are used. In addition, as the particles of the reflective particle group 36, in a case of using particles with a color other than white, for example, a pigment having a desirable color, or a resin particle described above containing dye may be used. As the pigment or the dye, if RGB or YMC colors are used, for example, a typical pigment or dye used for printing ink or a color toner is used.

An ink jet method or the like is performed, for example, to enclose the reflective particle group 36 between the substrates. In addition, when fixing the reflective particle group 36, after enclosing the reflective particle group 36, a particle group surface layer of the reflective particle group 36 is melted by heating (and pressuring if necessary), and thus, the fixing is performed while maintaining the particle spaces.

Next, the other configuration of the display medium will be described.

The size of the cell of the display medium 12 has a close relationship with the resolution of the display medium 12. As the cell is smaller, it is possible to manufacture the display medium 12 which displays a higher-definition image, and a length of the display substrate 20 of the display medium 12 in a substrate surface direction is generally from about 10 µm to about 1 µm.

To fix the display substrate 20 and the back surface substrate 22 to each other through the space member 24, fixing units such as engagement of bolts and nuts, clamping, clipping, and a frame for substrate fixation are used. In addition, fixing units such as an adhesive, thermal fusion, and ultrasonic bonding may be used.

The display medium 12 configured as described above is used for a bulletin board, a circulated board, an electronic whiteboard, advertisement, a signboard, a blinking mark, electronic paper, electronic newspapers, an electronic book, and documentary sheets commonly used with a copier and a printer where holding and rewiring of an image are performed.

Next, the display device will be described.

As described above, the display device 10 according to the exemplary embodiment includes the display medium 12, the voltage applying unit 16 which applies voltage to the display medium 12, and the control unit 18 (see FIG. 1).

The voltage applying unit 16 is electrically connected to the surface electrode 40 and the back surface electrode 46. In the exemplary embodiment, a case where both the surface electrode 40 and the back surface electrode 46 are electrically connected to the voltage applying unit 16 will be described, however, one of the surface electrode 40 and the back surface electrode 46 may be grounded, and the other thereof may be connected to the voltage applying unit 16.

The voltage applying unit 16 is connected to the control unit 18 so as to receive a signal.

The control unit 18 may be configured as a microcomputer including a Central Processing Unit (CPU) which manages operations of the entire device, a Random Access Memory (RAM) which temporarily stores various data items, and a Read Only Memory (ROM) in which various programs such as control programs for controlling the entire device are previously stored.

The voltage applying unit 16 is a voltage applying device for applying voltage to the surface electrode 40 and the back surface electrode 46, and applies voltage according to the control of the control unit 18 to between the surface electrode 40 and the back surface electrode 46.

Next, actions of the display device 10 will be described. The actions thereof will be described according to the operations of the control unit 18.

Herein, a case where the particle group 34A is charged to negative polarity and the particle group 34B is charged to positive polarity among the particle group 34 enclosed in the display medium 12, will be described. In addition, the description is given on the basis that, the dispersion medium 50 is transparent, and the reflective particle group 36 is white. That is, in the exemplary embodiment, a case where the display medium 12 displays respective colors presented by the movement of the particle group 34A and the particle group 34B, and displays a white color as a background color, will be described.

First, an initial operation signal which shows that the voltage is applied for a specific time so that the surface electrode 40 becomes a negative electrode and the back surface electrode 46 becomes a positive electrode, is output to the voltage applying unit 16. When a voltage of a threshold voltage or more, at which a concentration change is finished on the negative electrode, is applied between the substrates, the particles constituting the particle group 34A charged to negative polarity move to the back surface substrate 22 side and reach the back surface substrate 22 (see FIG. 2A). On the other hand, the particles constituting the particle group 34B charged to positive polarity move to the display substrate 20

At that time, for the color of the display medium 12 seen from the display substrate 20 side, white color as the color of the reflective particle group 36 is set as the background color and the color of the particle group 34B is seen. The particle group 34A is hidden behind the reflective particle group 36 and is hardly seen.

Time T1 may be previously stored in a memory such as the ROM (not shown) in the control unit 18, as information showing voltage applying time in voltage applying of the initial operation. At the time of process execution, the information showing the specific time may be read.

Next, if voltage is applied to between the surface electrode 40 and the back surface electrode 46, by setting the surface electrode 40 as a positive electrode and the back surface electrode 46 as a negative electrode by inverting the polarities of that of the voltage applied to the substrates, the particle group 34A charged to negative polarity moves to the display substrate 20 side and reaches the display substrate 20 (see FIG. 2B). On the other hand, the particle constituting the particle group 34B charged to positive polarity moves to the back surface substrate 22 side and reaches the back surface substrate 22 (see FIG. 2B).

At that time, for the color of the display medium 12 seen from the display substrate 20 side, white color as the color of the reflective particle group 36 is set as the background color and the color of the particle group 34A is seen. The particle group 34B is hidden behind the reflective particle group 36 and is hardly seen.

As described above, in the display device 10 according to the exemplary embodiment, display is performed as the particle group 34 (particle group 34A and particle group 34B) reaches and attaches to the display substrate 20 or the back surface substrate 22.

In the display medium 12 and the display device 10 according to the exemplary embodiment, the format of display by providing the surface electrode 40 and the back surface electrode 46 on the display substrate 20 and on the back surface substrate 22, respectively, and applying voltage to between the electrodes (that is, substrates) to move (migrate) the particle group 34 between the substrates, has been described, however, it is not limited thereto, and a format of the movement between the electrodes, for example, a format of display by providing the surface electrode 40 on the display substrate 20 and providing the electrode on the space member, and applying voltage to between the electrodes to move the particle group 34 between the display substrate 20 and the space member, may be used.

In the display medium 12 and the display device 10 according to the exemplary embodiment, the format of constituting the display medium 12 by providing the surface electrode 40 and the back surface electrode 46 on the display substrate 20 and on the back surface substrate 22, respectively, has been described, however, a format of disposing each electrode outside of the display medium 12 may be used.

In the display medium 12 and the display device 10 according to the exemplary embodiment, the format of applying two kinds (two colors) of the particle groups (34A and 34B) as the particle group 34 has been described, however, a format of applying one kind (one color) of particle group may be used, or a format of applying three kinds (three colors) or more of particle groups may be used.

EXAMPLES

Hereinafter, the exemplary embodiment of the present invention will be described in more detail with Examples. However, the exemplary embodiment of the present invention is not limited to each of Examples. In the description, if not otherwise specified, "parts" and "%" mean "parts by weight" and "% by weight".

Manufacture of Negative Charging Magenta Particle
Manufacture of Magenta Particle M1
1) Manufacture of Core Particle—Liquid Drying—

As resins (water-soluble resins) of the core particle, 6.48 g of styrene acrylic resin "X345 (manufactured by Seiko PMC Corporation)", and 0.72 g of melamine resin "MX035 (manufactured by Sanwa Chemical Co., Ltd.)" (corresponding to 10% by weight of the entire resins), and 2.0 g of magenta pigment (Red 3090 (manufactured by Sanyo Color Works, LTD.), and 24.1 g of distilled water are dispersed and mixed to prepare a dispersion phase.

Then, 3.5 g of surfactant "KF-6028 (manufactured by Shin-Etsu Chemical Co., Ltd.)" is dissolved in silicone oil "KF-96L-2cs (manufactured by Shin-Etsu Chemical Co., Ltd.)" to prepare 350 g of continuous phase, 50 g of the dispersion phase is added to this continuous phase, and emulsification is performed for 10 minutes at rotating speed of 9000 rpm, and at a temperature of 30° C., using an internal gear-type desktop disperser ROBOMICS (manufactured by Tokushukika Kogyo K.K.).

As a result, emulsified liquid having an emulsified liquid droplet diameter of about 1.6 μm is obtained. This is dried for 12 hours at a degree of vacuum of 20 mbar, and a water bath temperature of 50° C. by a rotary evaporator, to obtain particle dispersion liquid.

Further, a step of settling of the particle dispersion liquid by a centrifugal separator and a step of re-dispersing the particle dispersion liquid by an ultrasonic cleaning device are repeated three times, the excessive surfactant "KF-6028 (manufactured by Shin-Etsu Chemical Co., Ltd.)" is removed, and condensation is performed to obtain 6 g of core particle. Conditions of the centrifugal separation are set to 6000 rpm and 15 minutes.

As a result of SEM observation of the obtained core particle and image analysis, an average particle size is 0.6 μm and a C.V. value (index showing monodispersibility: Coefficient of Variation: CV [%]=(σ/D)×100 (σ: standard variation, D: average particle diameter)) is 33%.

2) Surface Treatment 15 g of silicone macromonomer "Silaplane FM-0721 (manufactured by JNC Corporation)", 2.3 g of 2-methacryloyloxy ethyl succinate "SA (manufactured by Shin-Nakamura Chemical Co., Ltd.)", 8 g of 2-hydroxyethyl methacrylate, and 3.0 g of 1H,1H,5H-octafluoropentyl methacrylate are mixed and dissolved into 120 g of isopropyl alcohol. 0.5 g of AIBN (2,2'-azobis(isobutyronitrile)) is dissolved thereto as a polymerization initiator, polymerization is performed for 6 hours at 60° C. under nitrogen flow, and the mixture is purified in methanol and dried under reduced pressure for 8 hours at 50° C. to generate polymer for surface treatment.

0.5 g of this polymer is dissolved in 14.5 g of n-butyl alcohol to obtain surface treatment solution.

Next, 1 g of the core particle is put into an eggplant flask of 200 mL, 29 g of silicone oil "KF-96L-2cs (manufactured by Shin-Etsu Chemical Co., Ltd.)" is added thereto, and the resultant is stirred and dispersed while applying ultrasonic wave at 25° C. to obtain core particle dispersion liquid. 10 g of the surface treatment solution is put into this. The input speed of the surface treatment solution is 0.5 mL/s.

Then, the core particle dispersion liquid is dried under reduced pressure at 50° C. and n-butyl alcohol is removed from the core particle dispersion liquid by an evaporator, to obtain a particulate material in which the polymer is precipitated on the surface of the core particle. Heating is performed for 1 hour at 100° C. in an oil bath while stirring the particle dispersion liquid in which the particulate material is dispersed, and then, heating is performed for 1.5 hours at 130° C.

After cooling thereof, the step of settling by a centrifugal separator and the step of re-dispersing by an ultrasonic cleaning device are repeated three times, with respect to the particle dispersion liquid, and excessive polymer is removed. The obtained particle is 0.7 g.

A magenta particle M1 is obtained with the steps described above.

Manufacture of Magenta Particles M2 to M10 and CM1 and CM2

Magenta particles M2 to M10 and CM1 and CM2 are obtained in the same manner as the magenta particle M1 except for changing polymerizable components and amounts thereof, a polymerization initiator and an amount thereof, and a solvent and an amount thereof according to Table 1 in generation of the polymer for surface treatment.

However, in the manufacturing of the magenta particle CM2, polymerization is performed for 6 hours at 70° C. under nitrogen flow to generate a polymer for surface treatment.

Manufacture of Positive Charging Cyan Particle
Manufacture of Cyan Particle C1
1) Manufacture of Core Particle—Liquid Drying—

As resins (water-soluble resins) of the core particle, 6.48 g of styrene acrylic resin "X345 (manufactured by Seiko PMC Corporation)", and 0.72 g of melamine resin "MX035 (manufactured by Sanwa Chemical Co., Ltd.)" (corresponding to 10% by weight of the entire resins), and 18.8 g of water dispersion liquid "Emacol SF Blue H524F (manufactured by Sanyo Color Works, LTD.)" containing 26% by weight of a cyan pigment "PB 15:3", and 24.1 g of distilled water are mixed while heating at 60° C. to prepare a dispersion phase so as to have ink solid content concentration of 15% and pigment concentration after drying of 50%.

Then, 3.5 g of surfactant "KF-6028 (manufactured by Shin-Etsu Chemical Co., Ltd.)" is dissolved in silicone oil "KF-96L-2cs (manufactured by Shin-Etsu Chemical Co., Ltd.)" to prepare 350 g of continuous phase, 50 g of the dispersion phase is added to this continuous phase, and emulsification is performed for 10 minutes at rotating speed of 8000 rpm, and at a temperature of 30° C., using an internal gear-type desktop disperser ROBOMICS (manufactured by Tokushukika Kogyo K.K.).

As a result, emulsified liquid having an emulsified liquid droplet diameter of about 2 µm is obtained. This is dried for 12 hours at a degree of vacuum of 20 mbar, and a water bath temperature of 50° C. by a rotary evaporator, to obtain particle dispersion liquid.

Further, a step of settling of the particle dispersion liquid by a centrifugal separator and a step of re-dispersing the particle dispersion liquid by an ultrasonic cleaning device are repeated three times, the excessive surfactant "KF-6028 (manufactured by Shin-Etsu Chemical Co., Ltd.)" is removed, and condensation is performed to obtain 6 g of core particle. Conditions of the centrifugal separation are set to 6000 rpm and 15 minutes.

As a result of SEM observation of the obtained core particle and image analysis, an average particle size is 0.6 µm and a C.V. value (index showing monodispersibility: Coefficient of Variation: CV [%]=(σ/D)×100 (σ: standard variation, D: average particle diameter)) is 30%.

2) Surface Treatment 15 g of silicone macromonomer "Silaplane FM-0721 (manufactured by JNC Corporation)", 8 g of 2-hydroxyethyl methacrylate, 2.3 g of phenoxyethylene glycol acrylate "NK ester AMP-10G (manufactured by Shin-Nakamura Chemical Co., Ltd.), and 4.4 g of a monomer having a blocked isocyanate group "Karenz MOI-BP (manufactured by SHOWA DENKO K.K)" are mixed and dissolved in 150 g of isopropyl alcohol. 0.7 g of AIBN (2,2'-azobis(isobutyronitrile)) is dissolved thereto as a polymerization initiator, polymerization is performed for 6 hours at 60° C. under nitrogen flow, and the mixture is purified in methanol and dried under reduced pressure for 8 hours at 50° C. to generate polymer for surface treatment.

0.5 g of this polymer is dissolved in 14.5 g of n-butyl alcohol to obtain surface treatment solution.

Next, 1 g of the core particle is put into an eggplant flask of 200 mL, 29 g of silicone oil "KF-96L-2cs (manufactured by Shin-Etsu Chemical Co., Ltd.)" is added thereto, and the resultant is stirred and dispersed while applying ultrasonic wave at 25° C. to obtain core particle dispersion liquid. 6 g of the surface treatment solution is put into this. The input speed of the surface treatment solution is 0.5 mL/s.

Then, the core particle dispersion liquid is dried under reduced pressure at 50° C. and n-butyl alcohol is removed from the core particle dispersion liquid by an evaporator, to obtain a particulate material in which the polymer is precipitated on the surface of the core particle. Heating is performed for 1 hour at 100° C. in an oil bath while stirring the particle dispersion liquid in which the particulate material is dispersed, and then, heating is performed for 1.5 hours at 130° C. to separate the blocked group of the blocked isocyanate group, and reaction between the polymer and the melamine resin in the core particle is performed.

After cooling thereof, the step of settling by a centrifugal separator and the step of re-dispersing by an ultrasonic cleaning device are repeated three times, with respect to the particle dispersion liquid, and excessive polymer is removed. The finally obtained particle is 0.7 g.

A cyan particle C1 is obtained with the steps described above.

Manufacture of Cyan Particles C2 to C5

Cyan particles C2 to C5 are obtained in the same manner as the cyan particle C1 except for changing polymerizable components and amounts thereof, a polymerization initiator and an amount thereof, and a solvent and an amount thereof according to Table 2 in generation of the polymer for surface treatment.

Manufacture of White Particle
Manufacture of White Particle W1

45 g of 2-vinylnaphthalene (manufactured by Nippon Steel & Sumikin Chemical Co., Ltd.), 45 g of silicone macromonomer "Silaplane FM-0721 (manufactured by JNC Corporation)", and 240 g of silicone oil "KF-96L-1cs (manufactured by Shin-Etsu Chemical Co., Ltd.)" are added into a reflux cooling tube-attached three-necked flask of 500 ml. After increasing a temperature to 65° C., bubbling is performed for 15 minutes with nitrogen gas, and 2.3 g of lauroyl peroxide (manufactured by Sigma-Aldrich Co., LLC.) is put therein as an initiator. Polymerization is performed for 24 hours at 65° C. under nitrogen atmosphere.

After centrifugalizing the obtained particle suspension for 10 minutes at 8000 rpm to remove a supernatant solution, a step of washing with re-dispersion using silicone oil "KF-96L-2cs (manufactured by Shin-Etsu Chemical Co., Ltd.)" are repeated three times. Finally, the particle solid content concentration is adjusted to 40% by weight by silicone oil to obtain dispersion liquid of the white particle W1. Volume average particle size of the white particle W1 is 450 nm.

Examples 1 to 14 and Comparative Examples 1 and 2

Manufacture of Electrophoretic Particle Dispersion Liquid

With the combination according to Table 3, each particle is mixed in silicone oil (KF-96L-2cs manufactured by Shin-Etsu Chemical Co., Ltd.) as a dispersion medium so as to have 25% by weight of the white particle, 0.8% by weight of the magenta particle, and 0.8% by weight of the blue particle, to prepare each electrophoretic particle dispersion liquid.

Manufacture of Display Medium

Each of the prepared electrophoretic particle dispersion liquid is enclosed between a pair of glass substrates (in a cell obtained by interposing Teflon (trade mark) sheet having a thickness of 50 μm as a space member between a pair of glass substrates) where indium tin oxide (ITO) electrodes are formed, to manufacture each display medium.

Evaluation

For each of the obtained display media, each color definition at the time of magenta display and cyan display, and the display stability are evaluated.

In addition, the dispersibility of the particles of the electrophoretic particle dispersion liquid is evaluated.

Evaluation of Definition

Direct-current (DC) voltage of 30 V is applied between electrode substrates (distance between substrates: 50 μm) of the prepared display medium for 5 seconds to switch positive and negative electrodes and move particles. Then, when positive voltage of 20 V is applied to the electrode on the display side for 3 seconds, the magenta particles are moved to the glass substrate on the display side and the magenta color is displayed.

On the other hand, when negative voltage of 20 V is applied to the electrode on the display side for 3 seconds, the cyan particles are moved to the glass substrate on the display side and the cyan color is displayed.

Definition of Magenta Color

For the display medium in a state where the magenta color is displayed, the display color on the display substrate side is measured using X939 manufactured by X-Rite, Incorporated. to evaluate definition of magenta color (M concentration). Evaluation criteria are as follows. Evaluation results are shown in Table 3.

G1: Case in which M concentration is equal to or more than 0.8

G2: Case in which M concentration is equal to or more than 0.6 and less than 0.8

G3: Case in which M concentration is less than 0.6 (or case of color separation failure)

Definition of Cyan Color

For the display medium in a state where the cyan color is displayed, the display color on the display substrate side is measured using X939 manufactured by X-Rite, Incorporated. to evaluate definition of cyan color (C concentration). Evaluation criteria are as follows. Evaluation results are shown in Table 3.

G1: Case in which C concentration is equal to or more than 0.8

G2: Case in which C concentration is equal to or more than 0.6 and less than 0.8

G3: Case in which C concentration is less than 0.6 (or case of color separation failure)

Display Stability

Direct-current (DC) voltage of 30 V is applied between electrode substrates (distance between substrates: 50 μm) of the manufactured display medium, in a state in which positive and negative electrodes are switched, the magenta color display and cyan color display are repeatedly performed, and concentration of the magenta color and the cyan color at each $200^{th}$ display is measured using X-Rite 939 manufactured by X-Rite, Incorporated.

Then, concentration change of the concentration measured for each display with respect to the first concentration is calculated, and number of times of display when any color change of the concentration of the magenta color and the cyan color is 0.2 is checked. Evaluation criteria are as follows. Evaluation results are shown in Table 3.

G1: Case in which number of times of display is equal to or more than 10,000 times G2: Case in which number of times of display is equal to or more than 5,000 and less than 10,000

G3: Case in which number of times of display is equal to or more than 3,000 and less than 5,000

G4: Case in which number of times of display is less than 3,000

Evaluation of Particle Dispersibility

The prepared electrophoretic particle dispersion liquid is enclosed in a glass tube of 2 mϕ so as to have a height of 50 mm, and is placed for 3 days at a room temperature (25° C.). After the placing, a height of non-colored supernatant liquid of the electrophoretic particle dispersion liquid enclosed in the glass tube is measured in a millimeter unit. Evaluation criteria are as follows. Evaluation results are shown in Table 3.

G1: Case in which the height of the supernatant liquid is less than 20 mm

G2: Case in which the height of the supernatant liquid is equal to or more than 20 and less than 40 mm G3: Case in which the height of the supernatant liquid is equal to or more than 40 mm

TABLE 1

| | Polymer for surface treatment | | | | | | | |
|---|---|---|---|---|---|---|---|---|
| | Polymerizable components | | | | | | Polymerization initiator | Solvent |
| | Type/Amount | Type/Amount | Type/Amount | Type/Amount | Type/Amount | Type/Amount | Type/Amount | Type/Amount |
| Magenta particle M1 | FM-0721/15 g (3.6 mol) | SA/2.3 g (11.8 mol) | HEMA/8 g (72.8 mol) | OFPMA/3.0 g (11.8 mol) | — | — | AIBIN/0.5 g | IPA/120 g |
| Magenta particle M2 | FM-0721/30 g (16.7 mol) | SA/2.3 g (27.9 mol) | HEMA/2 g (42.9 mol) | OFPMA/1.0 g (9.3 mol) | MOI-BP/0.3 g (3.2 mol) | — | AIBIN/0.5 g | IPA/120 g |
| Magenta particle M3 | FM-0721/30 g (26.8 mol) | A-SA/1 g (20.7 mol) | HEMA/1 g (34.4 mol) | OFPMA/0.3 g (4.5 mol) | MOI-BP/0.8 g (13.7 mol) | — | AIBIN/0.5 g | IPA/120 g |

TABLE 1-continued

| | Polymer for surface treatment | | | | | | |
|---|---|---|---|---|---|---|---|
| | Polymerizable components | | | | | Polymerization initiator | Solvent |
| | Type/Amount | Type/Amount | Type/Amount | Type/Amount | Type/Amount | Type/Amount Type/Amount | Type/Amount |
| Magenta particle M4 | FM-0721/50 g (46.0 mol) | A-SA/0.5 g (10.6 mol) | HEMA/0.7 g (24.7 mol) | OFPMA/0.3 g (4.6 mol) | MOI-BP/0.8 g (14.0 mol) | — AIBIN/0.5 g | IPA/120 g |
| Magenta particle M5 | FM-0725/3 g (1.4 mol) | FM-0721/47 g (43.8 mol) | A-SA/0.5 g (10.8 mol) | HEMA/0.7 g (25.1 mol) | OFPMA/0.3 g (4.7 mol) | MOI-BP/0.8 g AIBIN/0.5 g (14.2 mol) | IPA/120 g |
| Magenta particle M6 | FM-0725/3 g (1.4 mol) | FM-0721/47 g (44.9 mol) | CB-1/0.5 g (8.6 mol) | HEMA/0.7 g (25.7 mol) | OFPMA/0.3 g (4.8 mol) | MOI-BP/0.8 g AIBIN/0.5 g (14.6 mol) | IPA/120 g |
| Magenta particle M7 | FM-0721/47 g (40 mol) | CB-1/1.3 g (19.9 mol) | HEMA/0.7 g (22.9 mol) | OFPMA/0.3 g (4.3 mol) | MOI-BP/0.8 g (13.0 mol) | — AIBIN/0.5 g | IPA/120 g |
| Magenta particle M8 | FM-0721/47 g (9.3 mol) | CB-1/3.0 g (10.7 mol) | HEMA/10 g (76.0 mol) | OFPMA/0.3 g (1.0 mol) | MOI-BP/0.8 g (3.0 mol) | — AIBIN/0.5 g | IPA/120 g |
| Magenta particle M9 | FM-0721/47 g (7.5 mol) | CB-1/3.0 g (8.6 mol) | HEMA/10 g (60.9 mol) | OFPMA/3.0 g (7.9 mol) | MOI-BP/5.0 g (15.1 mol) | — AIBIN/0.5 g | IPA/120 g |
| Magenta particle M10 | FM-0721/47 g (8.7 mol) | CB-1/0.5 g (1.7 mol) | HEMA/10 g (71.3 mol) | OFPMA/0.2 g (0.6 mol) | MOI-BP/5.0 g (17.7 mol) | — AIBIN/0.5 g | IPA/120 g |
| Magenta particle CM1 | FM-0721/40 g (8.4 mol) | MAA/2.0 g (24.5 mol) | HEMA/7 g (56.6 mol) | OFPMA/3.0 g (10.5 mol) | — | — AIBIN/0.5 g | IPA/120 g |
| Magenta particle CM2 | FM-0721/50 g (5.0 mol) | HEMA/20 g (76.3 mol) | VSA-H/3.0 g (13.7 mol) | OFPMA/3.0 g (5.0 mol) | — | — AIBIN/0.4 g | IPA/200 g |

TABLE 2

| | Polymer for surface treatment | | | | | | |
|---|---|---|---|---|---|---|---|
| | Polymerizable components | | | | | Polymerization initiator | Solvent |
| | Type/Amount | Type/Amount | Type/Amount | Type/Amount | Type/Amount | Type/Amount Type/Amount | Type/Amount |
| Cyan particle C1 | FM-0721/15 g (3.2 mol) | HEMA/8 g (66.0 mol) | AMP-10G/2.3 g (12.8 mol) | MOI-BP/4.4 g (18.0 mol) | — | — AIBIN/0.7 g | IPA/150 g |
| Cyan particle C2 | FM-0721/25 g (10.5 mol) | HEMA/2 g (32.3 mol) | AMP-10G/2.3 g (25.2 mol) | MOI-BP/4.0 g (32.1 mol) | — | — AIBIN/0.7 g | IPA/150 g |
| Cyan particle C3 | FM-0721/25 g (10.3 mol) | HEMA/2 g (31.6 mol) | AMP-10G/2.3 g (24.6 mol) | MOI-BP/4.0 g (31.4 mol) | OFPMA/0.3 g (2.1 mol) | — AIBIN/0.7 g | IPA/150 g |
| Cyan particle C4 | FM-0721/40 g (27.5 mol) | HEMA/1 g (26.4 mol) | AMP-10G/1.5 g (26.9 mol) | MOI-BP/1.2 g (15.8 mol) | OFPMA/0.3 g (3.4 mol) | — AIBIN/0.7 g | IPA/150 g |
| Cyan particle C5 | FA-0721/80 g (59.0 mol) | HEMA/0.2 g (5.7 mol) | AMP-10G/1.5 g (28.8 mol) | MOI-BP/0.2 g (2.8 mol) | OFPMA/0.3 g (3.7 mol) | — AIBIN/0.7 g | IPA/150 g |

TABLE 3

| | Display medium | | | Definition | | Evaluation | |
|---|---|---|---|---|---|---|---|
| | White particle | Magenta particle | Cyan particle | Magenta color | Cyan color | Display stability | Particle dispersibility |
| Example 1 | W1 | M1 | C1 | G2 | G2 | G2 | G2 |
| Example 2 | W1 | M1 | C2 | G1 | G2 | G2 | G2 |
| Example 3 | W1 | M1 | C3 | G1 | G1 | G1 | G1 |
| Example 4 | W1 | M1 | C4 | G1 | G1 | G1 | G1 |
| Example 5 | W1 | M1 | C5 | G1 | G1 | G1 | G1 |
| Example 6 | W1 | M2 | C2 | G1 | G1 | G1 | G1 |
| Example 7 | W1 | M3 | C3 | G1 | G1 | G1 | G1 |
| Example 8 | W1 | M5 | C3 | G1 | G1 | G1 | G1 |
| Example 9 | W1 | M6 | C3 | G1 | G2 | G1 | G2 |
| Example 10 | W1 | M7 | C3 | G1 | G1 | G1 | G1 |
| Example 11 | W1 | M4 | C3 | G1 | G1 | G1 | G1 |
| Example 12 | W1 | M8 | C1 | G1 | G1 | G1 | G2 |
| Example 13 | W1 | M9 | C1 | G1 | G1 | G1 | G1 |

TABLE 3-continued

| | Display medium | | | Evaluation | | | |
|---|---|---|---|---|---|---|---|
| | | | | Definition | | | |
| | White particle | Magenta particle | Cyan particle | Magenta color | Cyan color | Display stability | Particle dispersibility |
| Example 14 | W1 | M10 | C1 | G2 | G1 | G2 | G2 |
| Comparative Example 1 | W1 | CM1 | C1 | G3 (color separation failure) | G3 (color separation failure) | G4 | G3 |
| Comparative Example 2 | W1 | CM2 | C1 | G3 (color separation failure) | G3 (color separation failure) | G4 | G4 |

From the results, it is found that the display stability of Examples is excellent compared to that of Comparative Examples. Thus, it is found that both of the magenta particle and the cyan particle of Examples have large charging amounts compared to that of Comparative Examples.

With the excellent display stability, it is found that color definition for each color and particle dispersibility of Examples are excellent compared to those of Comparative Examples.

In addition, details of abbreviation in Tables 1 and 2 are as follows.

Polymerizable Components

FM-0721: "Silaplane FM-0721 (manufactured by JNC Corporation)"; weight-average molecular weight Mw=5000

FM-0725: "Silaplane FM-0725 (manufactured by JNC Corporation)"; weight-average molecular weight Mw=10000

SA: 2-methacryloyloxyethyl succinate "SA (manufactured by Shin-Nakamura Chemical Co., Ltd.)", Formula (I) [Ra=a methyl group, X=—CH$_2$CH$_2$—, Y=—CH$_2$CH$_2$—, Z=hydrogen atom]

A-SA: 2-acryloyloxyethyl succinate "A-SA (manufactured by Shin-Nakamura Chemical Co., Ltd.)"; Formula (I) [Ra=hydrogen atom, X=—CH$_2$CH$_2$—, Y=—CH$_2$CH$_2$—, Z=hydrogen atom]

CB-1: 2-methacryloyloxyethyl phthalic acid "CB-1 (manufactured by Shin-Nakamura Chemical Co., Ltd.)"; Formula (I) [Ra=a methyl group, X=—CH$_2$CH$_2$—, Y=a phenylene group, Z=hydrogen atom]

MAA: Methacrylic acid; reactive compound having a hydroxyl group

HEMA: 2-hydroxyethyl methacrylate; reactive compound having a hydroxyl group

OFPMA: 1H,1H,5H-octafluoropentyl methacrylate; reactive compound having a fluorine group AMP-10G: phenoxyethylene glycol acrylate "NK ester AMP-10G (manufactured by Shin-Nakamura Chemical Co., Ltd.)"; reactive compound having a phenoxy group VSA-H: vinylsulfonate "VSA-H (manufactured by Asahi Kasei Finechem Co., Ltd.)"; reactive compound having a sulfonyl group MOI-BP: 2-[(3,5-dimethylpyrazolyl)carbonylamino]ethyl methacrylate "Karenz MOI-BP (manufactured by SHOWA DENKO K.K)"; reactive compound having a blocked isocyanate group Polymerization Initiator AIBIN: (2,2'-azobis(isobutyronitrile))

Solvent

IPA: isopropyl alcohol

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An electrophoretic particle coated with a polymer comprising A) a reactive compound represented by the following Formula (I), and B) a reactive compound having a silicone chain:

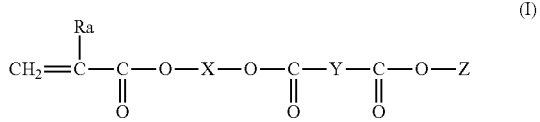

(I)

wherein in Formula (I), Ra represents a hydrogen atom or a methyl group; X represents a substituted or unsubstituted divalent hydrocarbon group; Y represents a substituted or unsubstituted divalent hydrocarbon group; and Z represents a hydrogen atom, or a substituted or unsubstituted monovalent hydrocarbon group.

2. The electrophoretic particle according to claim 1, wherein the reactive compound represented by Formula (I) is a reactive compound in which Ra represents a hydrogen atom or a methyl group, X represents an ethyl group or a propyl group, Y represents an ethyl group or a propyl group, and Z represents a hydrogen atom or a methyl group.

3. The electrophoretic particle according to claim 1, wherein the reactive compound represented by Formula (I) is selected from the group consisting of 2-acryloyloxyethyl succinate, 2-methacryloyloxyethyl phthalic acid, 2-methacryloyloxyethyl succinate, and 2-methacryloyloxypropyl succinate.

4. The electrophoretic particle according to claim 1, wherein a copolymerization ratio of the reactive compound represented by Formula (I) is from 1% to 50% by a molar ratio with respect to the entire polymerizable components.

5. The electrophoretic particle according to claim 1, wherein a weight-average molecular weight of the polymer is from 500 to 1,000,000.

6. The electrophoretic particle according to claim 1, wherein a covered or attached amount of the polymer with respect to a surface of a core particle is from 0.00001% by weight to 50% by weight with respect to the core particle.

7. The electrophoretic particle according to claim 1, wherein the polymer is a copolymer obtained by copolymerizing the reactive compound represented by Formula (I), the reactive compound having a silicone chain, a reactive compound having a hydroxyl group, and a reactive compound having a fluorine group.

8. The electrophoretic particle according to claim 1, wherein the polymer is a copolymer obtained by copolymerizing the reactive compound represented by Formula (I), the reactive compound having a silicone chain, a reactive compound having a hydroxyl group, a reactive compound having a phenoxy group, and a reactive compound having a fluorine group.

9. The electrophoretic particle according to claim 1, wherein the polymer is a copolymer obtained by copolymerizing the reactive compound represented by Formula (I), the reactive compound having a silicone chain, a reactive compound having a hydroxyl group, and a reactive compound having a phenoxy group.

10. The electrophoretic particle according to claim 1, wherein the polymer is a copolymer obtained by copolymerizing the reactive compound represented by Formula (I), the reactive compound having a silicone chain, a reactive compound having a hydroxyl group, a reactive compound having an amino group, and a reactive compound having a fluorine group.

11. The electrophoretic particle according to claim 1, of which a volume average particle size is from 0.1 μm to 10 μm.

12. An electrophoretic particle dispersion liquid comprising:
a dispersion medium; and
a particle group that is dispersed in the dispersion medium and contains the electrophoretic particle according to claim 1.

13. A display medium comprising:
a pair of substrates or a pair of electrodes, at least one of which has translucency; and
a region which is enclosed between the pair of substrates or between the pair of electrodes, and includes the electrophoretic particle dispersion liquid according to claim 12.

14. A display device comprising:
the display medium according to claim 13; and
a voltage applying unit that applies voltage to between the pair of substrates or the pair of electrodes of the display medium.

15. The electrophoretic particle of claim 1, wherein the reactive compound having a silicone chain as a polymerizable component comprises a dimethyl silicone compound having a terminal (meth)acrylate group.

16. The electrophoretic particle of claim 1, wherein the reactive compound having a silicone chain as a polymerizable component comprises a branched silicone compound.

* * * * *